United States Patent
Hildreth

(10) Patent No.: US 9,772,689 B2
(45) Date of Patent: Sep. 26, 2017

(54) ENHANCED GESTURE-BASED IMAGE MANIPULATION

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 12/041,927

(22) Filed: Mar. 4, 2008

(65) Prior Publication Data

US 2009/0228841 A1    Sep. 10, 2009

(51) Int. Cl.
  *G06F 3/01*    (2006.01)
  *G06F 3/03*    (2006.01)
(52) U.S. Cl.
  CPC ............ *G06F 3/017* (2013.01); *G06F 3/0304* (2013.01)
(58) Field of Classification Search
  CPC .... G06F 3/017; G06F 3/0304; G06K 9/00335
  USPC ......................................... 715/810, 863, 864
  See application file for complete search history.

(56) References Cited

U.S. PATENT DOCUMENTS

| | | | |
|---|---|---|---|
| 5,594,469 A | 1/1997 | Freeman et al. | |
| 5,745,165 A | 4/1998 | Atsuta et al. | |
| 6,144,366 A | 11/2000 | Numazaki et al. | |
| 6,160,899 A | 12/2000 | Lee et al. | |
| 6,215,890 B1* | 4/2001 | Matsuo et al. | 382/103 |
| 6,827,579 B2 | 12/2004 | Burdea et al. | |
| 7,000,200 B1* | 2/2006 | Martins | 715/863 |
| 7,018,211 B1 | 3/2006 | Birkhölzer et al. | |
| 2002/0006222 A1 | 1/2002 | Inagaki et al. | |
| 2002/0057383 A1 | 5/2002 | Iwamura | |
| 2003/0113018 A1* | 6/2003 | Nefian et al. | 382/181 |
| 2003/0156756 A1* | 8/2003 | Gokturk et al. | 382/190 |
| 2004/0189720 A1* | 9/2004 | Wilson et al. | 345/863 |
| 2005/0210417 A1 | 9/2005 | Marvit et al. | |
| 2005/0212767 A1 | 9/2005 | Marvit et al. | |
| 2005/0239028 A1 | 10/2005 | Wu et al. | |
| 2005/0271279 A1 | 12/2005 | Fujimura et al. | |
| 2006/0010400 A1 | 1/2006 | Dehlin et al. | |
| 2006/0101016 A1 | 5/2006 | Uehara | |
| 2006/0125785 A1 | 6/2006 | McAlindon | |
| 2006/0139314 A1* | 6/2006 | Bell | 345/156 |
| 2006/0164382 A1 | 7/2006 | Kulas et al. | |
| 2006/0164386 A1 | 7/2006 | Smith et al. | |
| 2006/0182346 A1 | 8/2006 | Yoda et al. | |
| 2006/0220882 A1* | 10/2006 | Makino | 340/573.1 |

(Continued)

FOREIGN PATENT DOCUMENTS

| | | | |
|---|---|---|---|
| JP | H08315154 A | 11/1996 | |
| JP | H11338120 A | 12/1999 | |

(Continued)

OTHER PUBLICATIONS

International Search Report & Written Opinion, issued in International Application No. PCT/US09/35544, dated Jul. 21, 2009, 7 pages.

(Continued)

*Primary Examiner* — Sara England
(74) *Attorney, Agent, or Firm* — Kilpatrick Townsend & Stockton

(57) ABSTRACT

Enhanced image viewing, in which a user's gesture is recognized from first and second images, an interaction command corresponding to the recognized user's gesture is determined, and, based on the determined interaction command, an image object displayed in a user interface is manipulated.

22 Claims, 16 Drawing Sheets

(56) References Cited

U.S. PATENT DOCUMENTS

| | | |
|---|---|---|
| 2007/0057912 A1 | 3/2007 | Romriell et al. |
| 2008/0013826 A1 | 1/2008 | Hillis et al. |
| 2008/0016955 A1* | 1/2008 | Merino-Lopez et al. ...... 73/146 |
| 2008/0030460 A1 | 2/2008 | Hildreth et al. |
| 2008/0036743 A1 | 2/2008 | Westerman et al. |
| 2008/0089587 A1 | 4/2008 | Kim et al. |
| 2008/0141181 A1 | 6/2008 | Ishigaki et al. |
| 2009/0109036 A1 | 4/2009 | Schalla et al. |
| 2009/0164937 A1* | 6/2009 | Alviar et al. ................ 715/800 |
| 2010/0277489 A1 | 11/2010 | Geisner et al. |
| 2011/0289456 A1 | 11/2011 | Reville et al. |

FOREIGN PATENT DOCUMENTS

| | | |
|---|---|---|
| JP | 2000075991 A | 3/2000 |
| JP | 2000196914 A | 7/2000 |
| JP | 2005051472 A | 2/2005 |
| JP | 2005301693 A | 10/2005 |
| JP | 2006099749 A | 4/2006 |
| JP | 2007538318 A | 12/2007 |
| JP | 2008040576 A | 2/2008 |
| JP | 2008530661 A | 8/2008 |
| WO | WO-2006086508 A2 | 8/2006 |
| WO | WO2011059202 A2 | 5/2011 |
| WO | WO2011134112 A1 | 11/2011 |

OTHER PUBLICATIONS

International Search Report & Written issued in International Application No. PCT/US09/35555, mailed Jul. 28, 2009, 7 pages.

International Search Report & Written Opinion issued in International Application No. PCT/US09/48271, mailed Aug. 14, 2009, 11 pages.

Fan et al., "Pull and Push: Proximity-Aware User Interface for Navigating in 3D Space Using a Handheld Camera," Dept. Of Comput. Sci. &Technol., Tsinghua Univ., Beijing, China, Proceedings 13th International Conference, HCI International 2009, pp. 133-140.

Keskin et al. "Real time hand tracking and 3d gesture recognition for Interactive interfaces using hmm," Computer Engineering Dept.; Bogazici University, E-Mail:

Mihara, I., et al., "A Realtime Vision-Based Interface Using Motion Processor and Applications to Robotics", Systems and Computers in Japan, vol. 34 No. 3, 2003, Translated from Denshi Joho Tsushin Gakkai Ronbunshi, vol. J84-D-11, No. 9, Sep. 2001, pp. 2070-2078, 10 pages.

* cited by examiner

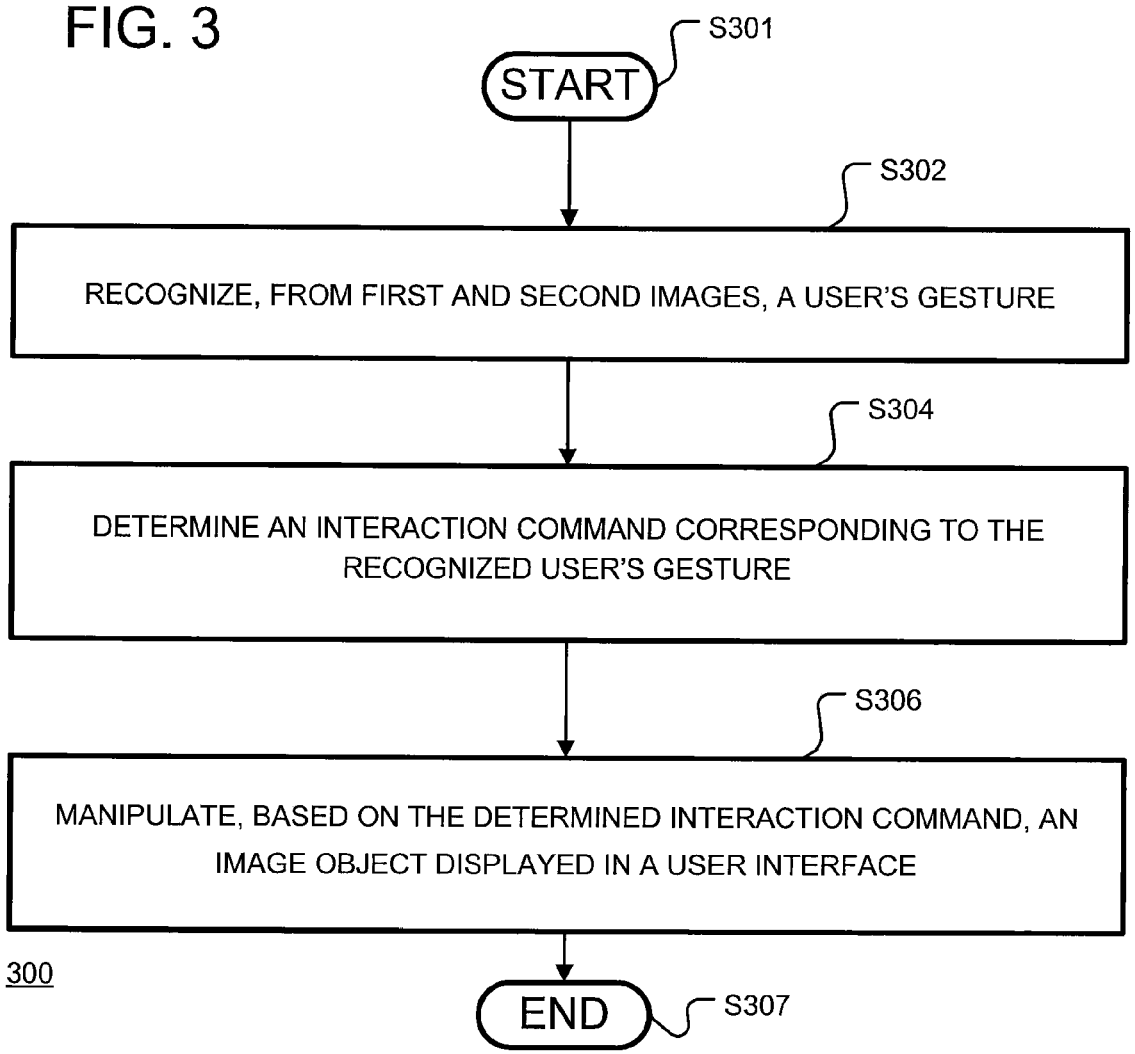

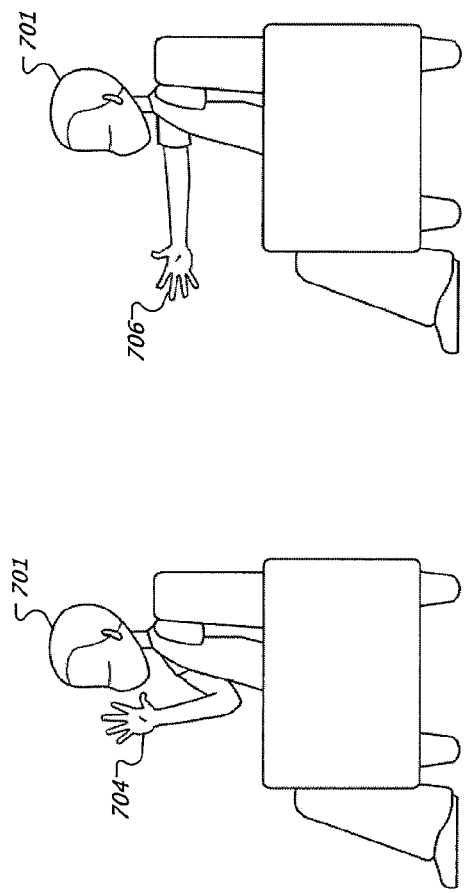
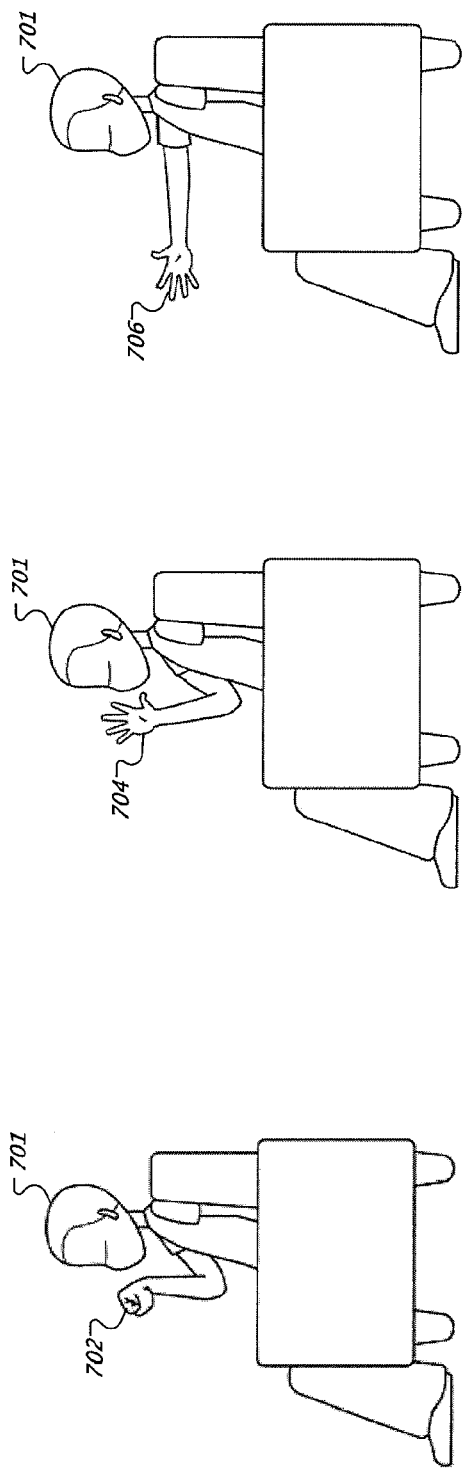
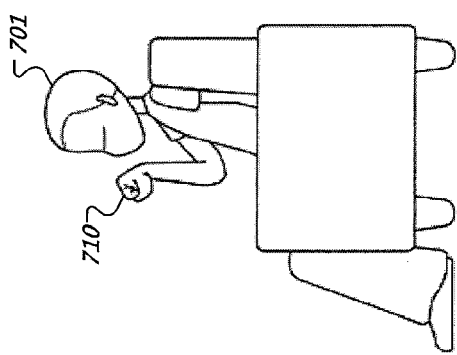
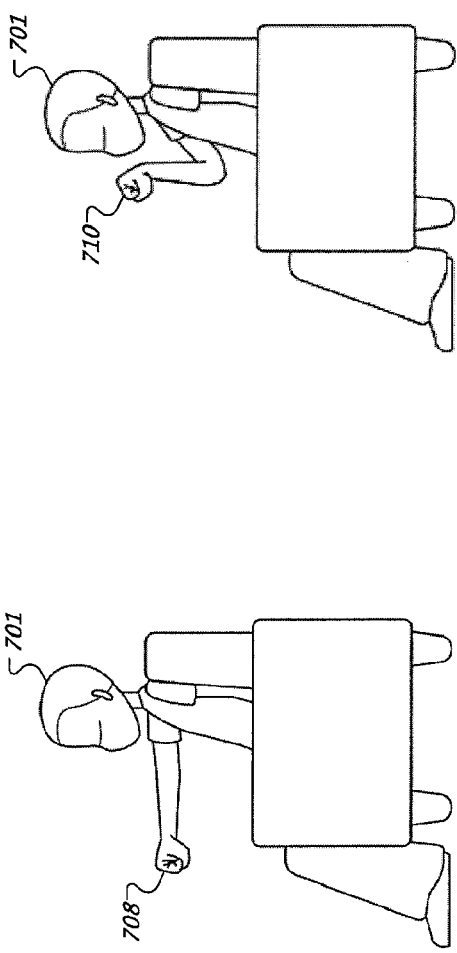
FIG. 7A  FIG. 7B  FIG. 7C  FIG. 7D  FIG. 7E

ENHANCED GESTURE-BASED IMAGE MANIPULATION

FIELD

The present disclosure generally relates to controls (or widgets).

BACKGROUND

An input device or pointing device is a hardware component that allows a computer user to input data into a computer. A control (or widget) is an interface element that the computer user interacts with, such as by using an input device, to provide a single interaction point for the manipulation of data. A control may be used, for example, to view or manipulate images.

SUMMARY

According to one general implementation, an enhanced approach is provided for capturing a user's gesture in free space with a camera, recognizing the gesture, and using the gesture as a user input to manipulate a computer-generated image. In doing so, images such as photos may be interacted with through straightforward, intuitive, and natural motions of the user's body.

According to another general implementation, a process includes recognizing, from first and second images, a user's gesture, determining an interaction command corresponding to the recognized user's gesture, and manipulating, based on the determined interaction command, an image object displayed in a user interface.

Implementations may include one or more of the following features. For example, the interaction command may include a selection command, and manipulating the image object may further include selecting the image object for further manipulation. Recognizing the user's gesture may further include detecting an arm-extended, fingers-extended, palm-forward hand pose of the user in the first image, and detecting an arm-extended, fingers curled, palm-down hand pose of the user in the second image.

In further examples, the interaction command may include an image pan command, and manipulating the image object may further include panning the image object relative to the user interface. Recognizing the user's gesture may further include detecting a first position of an arm of the user in the first image, detecting a second position of the arm of the user in the second image, and determining a magnitude and direction of a change between the first position and the second position. In a distance mode, manipulating the image object may further include determining a displacement position of the image object correlating to the determined magnitude and direction, and displaying the image object in the displacement position. In a velocity mode, manipulating the image object may further include determining a scroll magnitude and direction correlating to the determined magnitude and direction, and scrolling the image object based on the determined scroll magnitude and direction.

In additional examples, the interaction command may include an image zoom command, and manipulating the image object may further include zooming the image object relative to the user interface. Recognizing the user's gesture may include detecting a first position of an arm of the user in the first image, detecting a second position of the arm of the user in the second image, and determining a magnitude and direction of a change between the first position and the second position. In a distance mode, manipulating the image object may further include determining a magnification factor correlating to the determined magnitude and direction, and applying the determined magnification factor to the image object. In a velocity mode, manipulating the image object may further include determining an adjustment magnitude and direction correlating to the determined magnitude and direction, and iteratively adjusting a magnification factor of the image object based on the determined adjustment magnitude and direction.

In additional examples, the interaction command may further include a rotation command, and manipulating the object may further include rotating the image object relative to the user interface. Recognizing the user's gesture may further include detecting a first orientation of a hand of the user in the first image, detecting a second orientation of the hand of the user in the second image, and determining an orientation change between the first position and the second position. In a distance mode, manipulating the image object may further include determining displacement orientation of the image object correlating to the determined magnitude and direction, and displaying the image object in the displacement orientation. In a velocity mode, manipulating the image object may further include determining an adjustment magnitude and direction correlating to the determined magnitude and direction, and iteratively adjusting an orientation of the image object based on the determined adjustment magnitude and direction.

In other examples, the image object may be manipulated if a magnitude of the user's gesture exceeds a predetermined threshold. The image object may be manipulated in a manipulation direction mirroring a direction of the user's gesture. Recognizing the user's gesture may further include recognizing a first selection gesture, recognizing a first interaction gesture, recognizing a de-selection gesture, recognizing a repositioning gesture, recognizing a second selection gesture, and recognizing a second interaction gesture. Manipulating the image object may further include selecting the image object based on recognizing the first selection gesture, adjusting, using a single adjustment technique associated with the first and second interaction gestures, the image object based on recognizing the first and second interaction gestures, and filtering the repositioning gesture. The interaction command may include a preview image command, and manipulating the image object may further include selecting, from a plurality of preview image objects, the image object.

According to another general implementation, a system includes a user interface configured to display an image, and a processor. The processor is configured to recognize, from first and second images, a users gesture, to determine an interaction command corresponding to the recognized user's gesture, and to manipulate, based on the determined interaction command, the image object. The system may further include a time-of-flight camera configured to generate the first and second images.

In a further general implementation, a computer program product is tangibly embodied in a machine-readable medium. The computer program product includes instructions that, when read by a machine, operate to cause data processing apparatus to recognize, from first and second images, a user's gesture, to determine an interaction command corresponding to the recognized user's gesture, and to manipulate, based on the determined interaction command, an image object displayed in a user interface.

The details of one or more implementations are set forth in the accompanying drawings and the description, below.

Other features and advantages of the disclosure will be apparent from the description and drawings, and from the claims.

BRIEF DESCRIPTION OF THE DRAWINGS

FIG. 3 is a flowchart of an exemplary process.
FIGS. 4 to 13 illustrate exemplary gestures and concomitant user interfaces

DETAILED DESCRIPTION

Figure 1A:
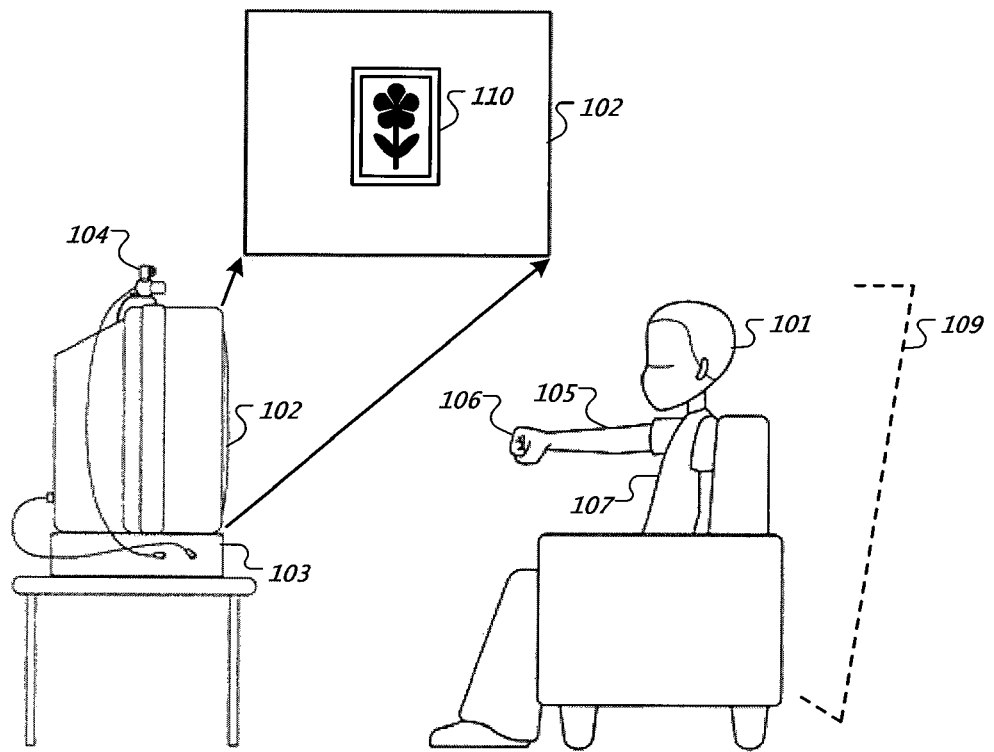
FIG. 1 is a contextual diagram demonstrating image manipulation using recognized gestures.

According to one general implementation, an enhanced approach is provided for capturing a user's gesture in free-space with a camera, recognizing the gesture, and using the gesture as a user input to manipulate a computer-generated image. In doing so, images such as photos may be interacted with through straightforward, intuitive, and natural motions of the user's body.

In particular, a camera such as a depth camera may be used to control a computer or hub based on the recognition of gestures or changes in gestures of a user. Unlike touchscreen systems that suffer from the deleterious, obscuring effect of fingerprints, gesture-based input allows photos, videos, or other images to be clearly displayed or otherwise output based on the user's natural body movements or poses. With this advantage in mind, gestures may be recognized that allow a user to view, pan (i.e., move), size, rotate, and perform other manipulations on image objects.

A depth camera, which may be also referred to as a time-of-flight camera, may include infrared emitters and a sensor. The depth camera may produce a pulse of infrared light and subsequently measure the time it takes for the light to travel to an object and back to the sensor. A distance may be calculated based on the travel time.

As used herein throughout, a "gesture" is intended to refer to a form of non-verbal communication made with part of a human body, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, a hand or body twisting gesture, or a finger pointing gesture. A gesture may be detected using a camera, such as by analyzing an image of a user, using a tilt sensor, such as by detecting an angle that a user is holding or tilting a device, or by any other approach.

A body part may make a gesture (or "gesticulate") by changing its position (i.e. a waving motion), or the body part may gesticulate without changing its position (i.e. by making a clenched fist gesture). Although the enhanced control uses, as examples, hand and arm gestures to effect the control of functionality via camera input, other types of gestures may also be used.

FIG. 1 is a contextual diagram demonstrating image manipulation using recognized gestures. In FIG. 1, user 101 is sitting in front of a user interface 102 output on a display of a media hub 103, and a camera 104, viewing one or more image objects (e.g., digital photographs or other images) on the user interface 102. The user's right arm 105, right hand 106, and torso 107 are within the field-of-view 109 of the camera 104.

Background images, such as the sofa that the user 101 is sitting on or user 101's torso and head itself, are sampled, filtered, or otherwise ignored from the gesture recognition process. For instance the camera 101 may ignore all candidate or potential control objects disposed further than a certain distance away from the camera, where the distance is predefined or dynamically determined. In one instance, that distance could lie between the user's outstretched fist and the user's torso. Alternatively, a plane could be dynamically defined in front of the user's torso, such that all motion or gestures that occur behind that torso are filtered out or otherwise ignored.

To indicate his desire to have the media hub 103 move a selected image object, the user 101 may move his hand in any direction, for instance along a plane parallel to the user interface 102. For example, to move a selected image object 110 to a higher location on the user interface 102, the user may gesticulate by moving his right arm 105 in an upward motion, as illustrated in FIG. 1B.

Figure 1B:
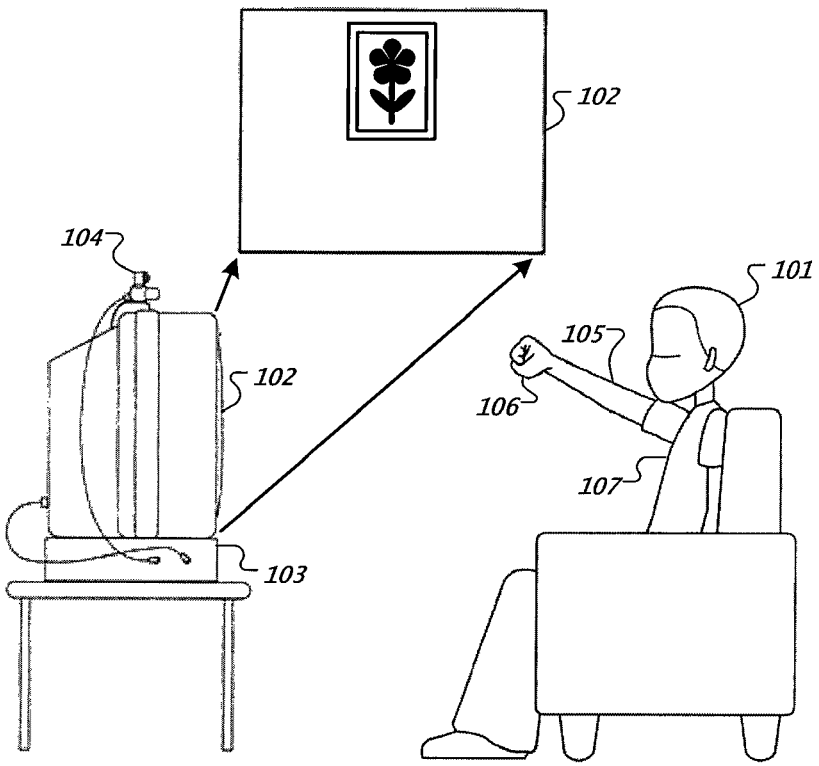

From a first camera image, a pose of the hand 105 in which the fingers are closed in a fist (i.e., curled fingers, as illustrated in FIG. 1A) is detected. From a second camera image, the change in position of the hand 106 and thus the gesture performed by the upward motion, is also detected, recognized or otherwise determined. Based upon the gesture recognized from the upward motion of the arm 105, an image object movement or interaction command is determined, and the selected image object 110 is moved to a higher location on the user interface 102 (as illustrated in FIG. 1B), in a movement consistent with the detected motion of the arm 105.

The magnitude, displacement, or velocity of the movement of the image object 110 may correlate to the magnitude, displacement, or velocity of the user's gesture. In general, a hand movement a plane parallel to the user interface 102 ("in an X-Y direction") along may cause a selected image object to move in the user interface 102 in a corresponding direction in a distance proportional to the movement distance of the hand.

By "corresponding," the distance may have a 1:1 relationship with the distance moved by the hand, some other relationship, or the relationship may be variable or dynamically determined. For instance, and as perhaps determined by an anatomical model, small movements at the outside extent of the user's reach may map or otherwise correspond to larger manipulations of the image in the user interface, than would larger hand movements that occur directly in front of the user. Put another way, acceleration, deceleration, or other operations may be applied to gestures to determine or affect the magnitude of a concomitant image manipulation.

The magnitude may also be a function of distance and speed. A magnitude-multiplier may adapt to a user's style over a period of time, based upon the distance and speed that the user has performed previous gestures recorded over a period of time. Alternatively, the magnitude-multiplier may adapt to a user's style while the gesture is being performed, based on the speed observed during the gesture. The magnitude-multiplier may be decreased if the user moves more quickly (for users whose style is to flail their arms wildly), or increased if the user moves more slowly (for users whose style is more deliberate).

Movement gestures may result in other image manipulation commands. For example, movement gestures may be used as part of a magnification feature. A sub-region of an image object may be shown on the user interface 102. Movement gestures may move the sub-region within the image object. As another example, movement gestures may be used to view image objects in a directory or list of image objects. Image objects may be scaled to fit the size of the user interface 102 (i.e., one image object may be displayed on the user interface 102 at a time). A movement gesture may "flip" to the next or previous image object (i.e., the next and previous image objects may not be displayed until they are "flipped" in).

The direction of the movement of the image object 110 may be the same as, orthogonal to, may mirror, or have any other relationship with the movement of the hand 106. For instance, in one arrangement in which the directions are the same, an upward hand gesture may cause the image object 110 to move upward, as if the user 106 is yanking the image object vertically. In such an arrangement, a gesture to the right may cause the image object 110 to move to the right in relation to the user (i.e. moving left on the user interface 102), or to move right on the user interface (i.e. moving left in relationship to the user). This mapping of directions may be preset, may be user selectable, or may be determined based on past use.

In another implementation in which the directions are mirrored (for example, a "scroll mode"), an upward hand gesture may operate in the same way as the upward movement of a scroll bar, causing the image object 110 actually to move down. In such an arrangement, a gesture to the right may cause the image object 110 to operate as if a scroll bar is moved to the right (i.e. moving the image object to the left in relation to the user and to the right on the user interface 102), and vice versa.

Figure 2:
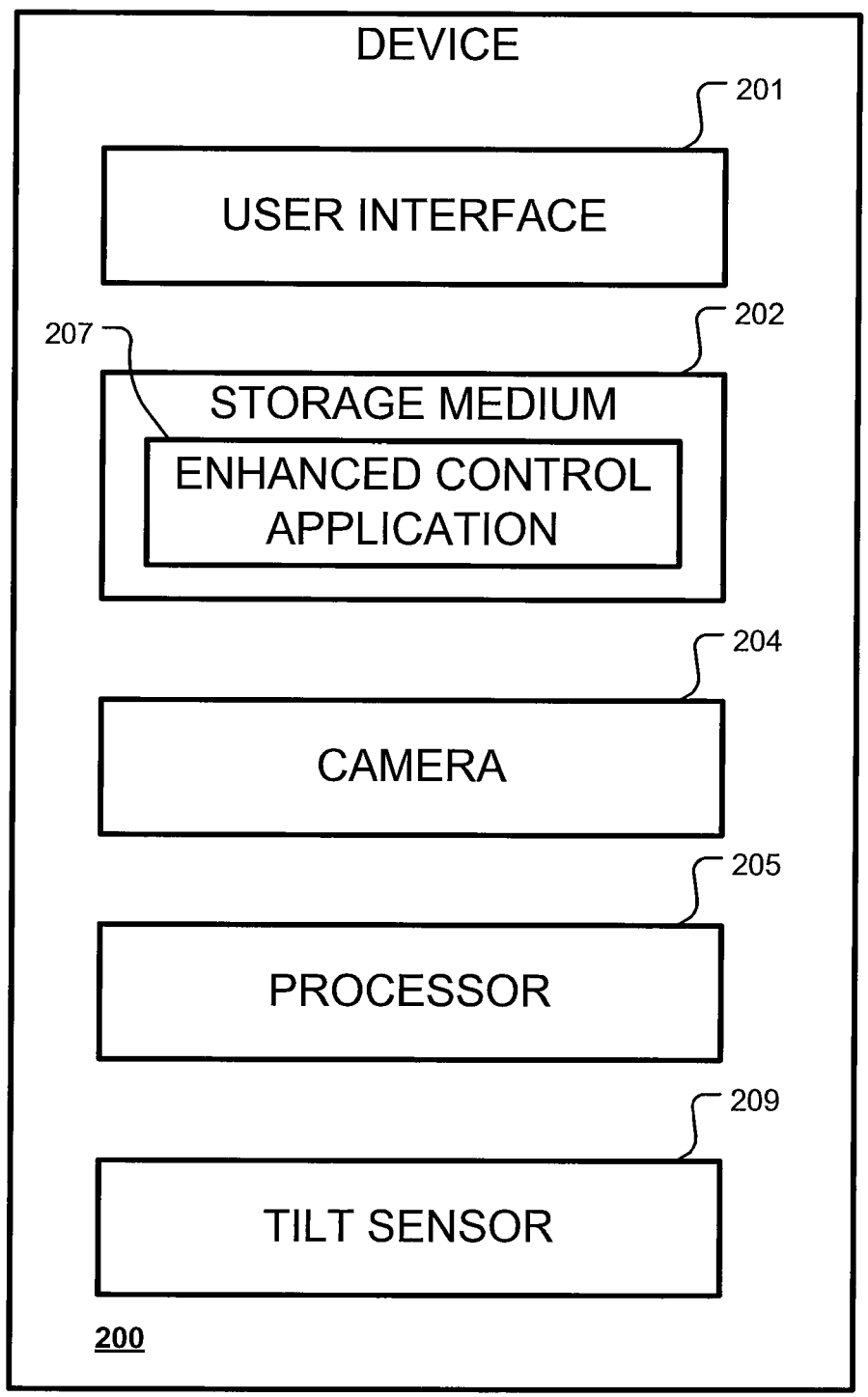
FIG. 2 is a block diagram of an exemplary device.

FIG. 2 is a block diagram of a device 200 used to implement image manipulation. Briefly, and among other things, the device 200 includes a user interface 201, a storage medium 202, a camera 204, a processor 205, and a tilt sensor 209.

The user interface 201 is a mechanism for allowing a user to interact with the device 200, or with applications invoked by the device 200. The user interface 201 may provide a mechanism for both input and output, allowing a user to manipulate the device or for the device to produce the effects of the user's manipulation. The device 200 may utilize any type of user interface 201, such as a graphical user interface (GUI), a voice user interface, or a tactile user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including an object or representation such as an avatar.

The storage medium 202 stores and records information or data, and may be an optical storage medium, magnetic storage medium, flash memory, or any other storage medium type. Among other things, the storage medium is encoded with an enhanced control application 207 that effects enhanced input using recognized gestures.

The camera 204 is a device used to capture images, either as still photographs or a sequence of moving images. The camera 204 may use the light of the visible spectrum or with other portions of the electromagnetic spectrum, such as infrared. For example, the camera 204 may be a digital camera, a digital video camera, or any other type of device configured to capture images. The camera 204 may include one or more cameras. In some examples, the camera 204 may be configured to capture images of an object or user interacting with an application. For example, the camera 204 may be configured to capture images of a user or person physically gesticulating in free-space (e.g. the air surrounding the user), or otherwise interacting with an application within the field of view of the camera 204.

The camera 204 may be a stereo camera, a time-of-flight camera, or any other camera. For instance the camera 204 may be an image detector capable of sampling a background image in order to detect motions and, similarly, gestures of a user. The camera 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected to and in operable communication with, over a wireline or wireless pathway, the camera 204 and the user interface 201, and is configured to control the operation of the processor 205 to provide for the enhanced control. In one configuration, the device 200 uses the processor 205 or other control circuitry to execute an application that provides for enhanced camera-based input. Although the camera 204 may be a separate unit (such as a webcam) that communicates with the device 200, in other implementations the camera 204 is built into the device 200, and communicates with other components of the device 200 (such as the processor 205) via an internal bus.

Although the device 200 has been described as a personal computer (PC) or set top box, such a description is made merely for the sake of brevity, and other implementations or manifestations are also contemplated. For instance, the device 200 may be implemented as a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, or any other type of electronic device that includes a processor or other control circuitry configured to execute instructions, or any other apparatus that includes a user interface.

In one example implementation, input occurs by using a camera to detect images of a user performing gestures. For instance, a mobile phone can be placed on a table and may be operable to generate images of a user using a face-forward camera. Alternatively, the gesture may be recognized or detected using the tilt sensor 209, such as by detecting a "tilt left" gesture to move a representation left and to pan an image left or rotate an image counter-clockwise, or by detecting a "tilt forward and right" gesture to move a representation up and to the right of a neutral position, to zoom in and pan an image to the right.

The tilt sensor 209 may thus be any type of module operable to detect an angular position of the device 200, such as a gyroscope, accelerometer, or a camera-based optical flow tracker. In this regard, image-based input may be supplemented with or replaced by tilt-sensor input to perform functions or commands desired by a user. Put another way, detection of a user's gesture may occur without using a camera, or without detecting the user within the images. By moving the device in the same kind of stroke pattern as the user desires to manipulate the image on the user interface, the user is enabled to control the same interface or application in a straightforward manner.

FIG. 3 is a flowchart illustrating a computer-implemented process 300 that effects image manipulation using recognized gestures. Briefly, the computer-implemented process 300 includes recognizing, from first and second images, a user's gesture; determining an interaction command corresponding to the recognized user's gesture; and manipulating, based on the determined interaction command, an image object displayed in a user interface.

In further detail, when the process 300 begins (S301), a user's gesture is recognized from first and second images (S302). The first and second images may be derived from individual image snapshots or from a sequence of images that make up a video sequence. Each image captures position information that allows an application to determine a pose or gesture of a user.

Generally, a gesture is intended to refer to a movement, position, pose, or posture that expresses an idea, opinion, emotion, communication, command, demonstration or expression. For instance, the user's gesture may be a single or multiple finger gesture; a single hand gesture; a single hand and arm gesture; a single hand and arm, and body gesture; a bimanual gesture; a head pose or posture; an eye position; a facial expression; a body pose or posture, or any other expressive body state. For convenience, the body part or parts used to perform relevant gestures are generally referred to as a "control object." The user's gesture in a single image or between two images may be expressive of an enabling or "engagement" gesture.

There are many ways of determining a user's gesture from a camera image. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the gesture of the user changes if all five fingers are retracted into a ball with the palm remaining forward, even if the overall position of the hand or arm remains static.

Gestures may be detected using heuristic techniques, such as by determining whether the hand position information passes explicit sets of rules. For example, the gesture of "swiping the hand off to one side" may be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the hand detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

Criteria may be used to filter out irrelevant or unintentional candidate gestures. For example, a plane may be defined at a predetermined distance in front of a camera, where gestures that are made or performed on the far side of the plane from the camera are ignored, while gestures or potential gestures that are performed between the camera and the plane are monitored, identified, recognized, filtered, and processed as appropriate. The plane may also be defined relative to another point, position or object, such as relative to the user's torso. Furthermore, the enhanced approach described herein may use a background filtering model to remove background images or objects in motion that do not make up the control object.

In addition to recognizing gestures or changes in gestures, other information may also be determined from the images. For example, a facial detection and recognition process may be performed on the images to detect the presence and identity of users within the image. Identity information may be used, for example, to determine or select available options, types of available interactions, or to determine which of many users within an image is to be designated as a controlling user if more than one user is attempting to engage the input functionality.

So as to enable the input of complex commands and to increase the number of input options, the process for recognizing the user's gesture may further include recognizing a first displacement in a first direction, and recognizing a second displacement in a second direction, and aggregating these multiple displacements as a single gesture. Furthermore, the recognition of the user's gesture may determine a magnitude and direction of the user's gesture.

An engagement gesture activates or invokes functionality that monitors other images for gesture-based command inputs, and ignores random or background body motions. In one example, the engagement gesture is a transition from a first hand pose in which the hand is held in an upright position with the palm forward and with all fingers and thumb spread apart widely to a second hand pose in which the hand is held in a closed fist.

Figure 4A:
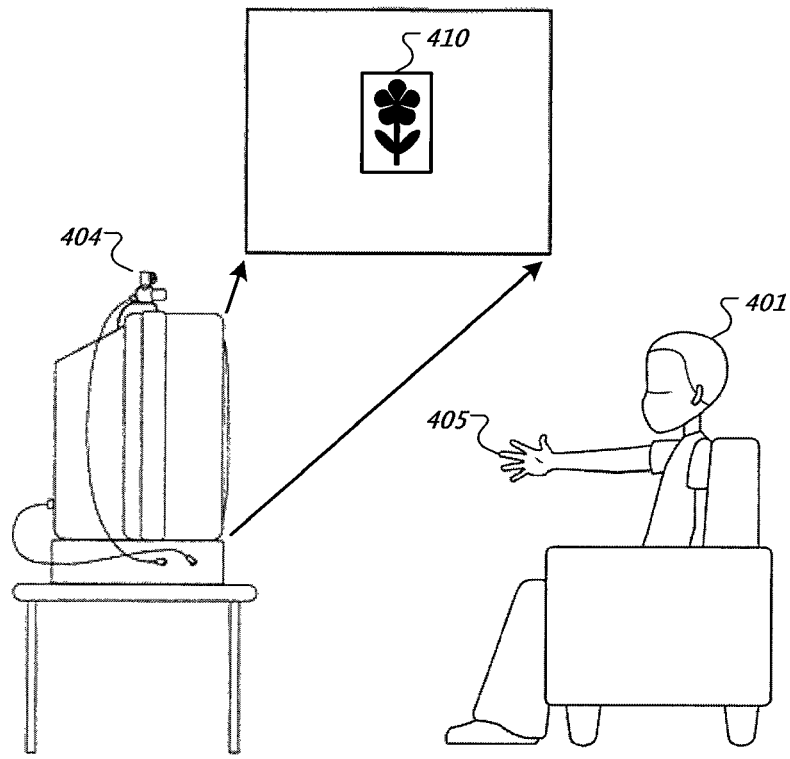
Figure 4B:
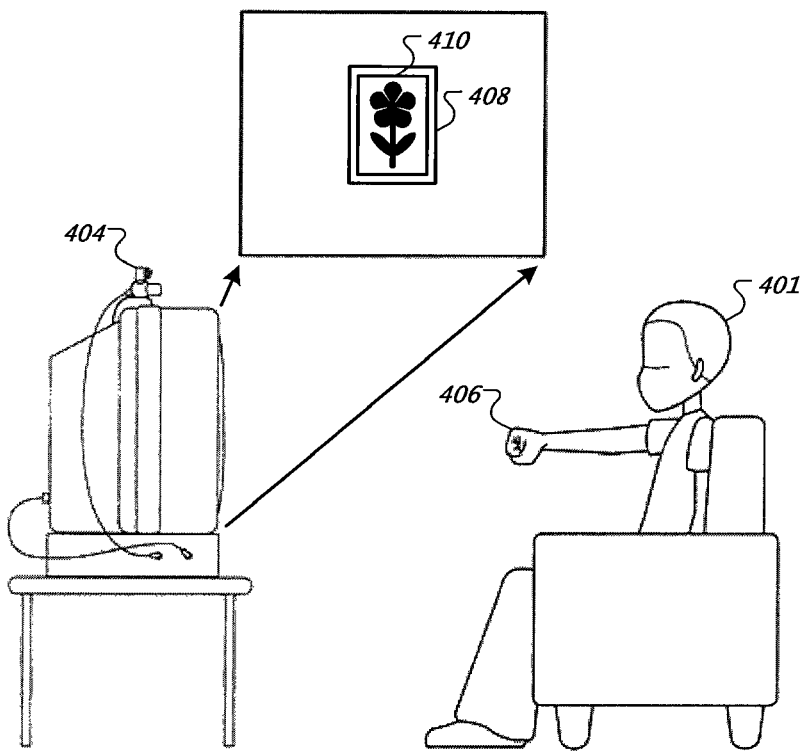

FIGS. 4A-4B illustrate an exemplary engagement gesture and a user interface that results from the engagement gesture. In particular, two images of the user 401 captured by the camera 402 capture the user's hand gesticulating from an open hand pose 405 with palm forward and fingers spread wide (as illustrated in FIG. 4A) to a closed-fist hand pose 406 (as illustrated in FIG. 4B).

The performance of this gesture by the user causes the image object 410 to be highlighted within the user interface to denote selection of the image object 410. In FIG. 4B, for example, the image object 410 is highlighted using a double border 408 that appear around an image object 410, designating the image object 410 as a selected image object. The user, in effect, is virtually "grabbing" the image object 410 in free space to select it. Selected image objects may be manipulated by other recognized gestures, such as the movement gesture discussed above with respect to FIG. 1.

In addition to body, arm, or hand gestures, finger pointing gestures can be recognized from one or more images. For instance, a "point left" gesture can be made with the tip of a user's finger and detected by analyzing an image of a finger. Fingerprint analysis or other approaches can be used to determine the direction of a pointing fingertip. In other example implementations, and as noted above, a gesture can be detected without using a camera, such as where the gesture is a verbal gesture or is detected using a tilt sensor or accelerometer.

Returning to FIG. 3, an interaction command corresponding to the recognized user's gesture is determined (S304). Image interaction commands may be mapped to a user's gestures. For example, the movement gesture discussed above with respect to FIG. 1 may be mapped to an image movement command. Other examples include a hand rotation gesture mapped to an image rotation command, and hand movement along an axis that is perpendicular to the plane defined by the user interface (the "Z axis") mapped to an image sizing, zooming or magnification command. In some implementations, interaction commands may result in a manipulation direction mirroring a direction of the user's gesture. For example, a user's right-to-left movement gesture may result in an image object being moved from left to right.

Based on the determined interaction command, an image object displayed in a user interface is manipulated (S306), thereby ending the process 300 (S307). For example, based on a determined image movement command, an image object (e.g., image object 110, FIG. 1) may be moved to a location corresponding to a user's arm movement along a plane parallel to a display screen. As another example, based on a determined image sizing command, an image object may be sized corresponding to a determined direction and magnitude of a user's arm movement.

Figure 5A:
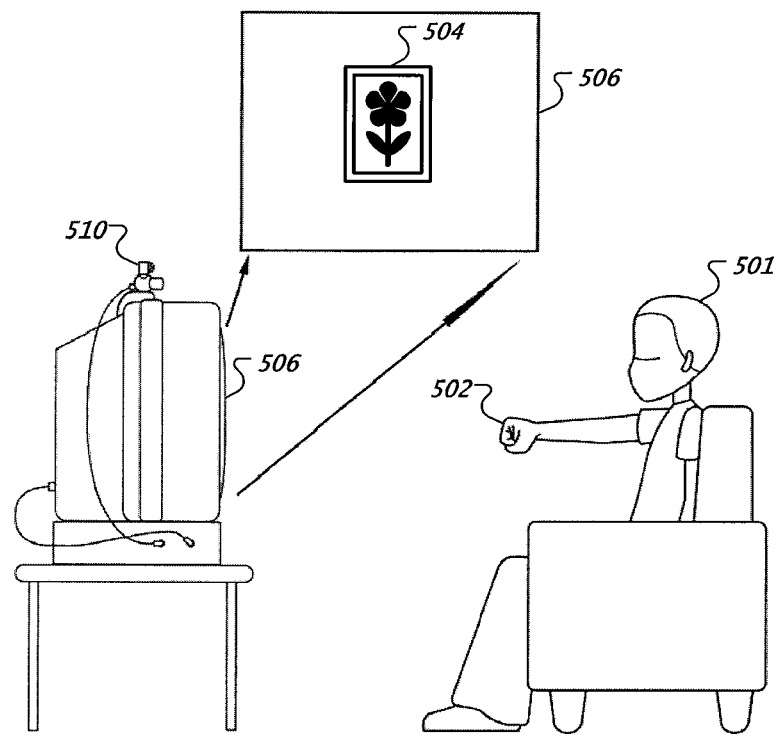
Figure 5B:
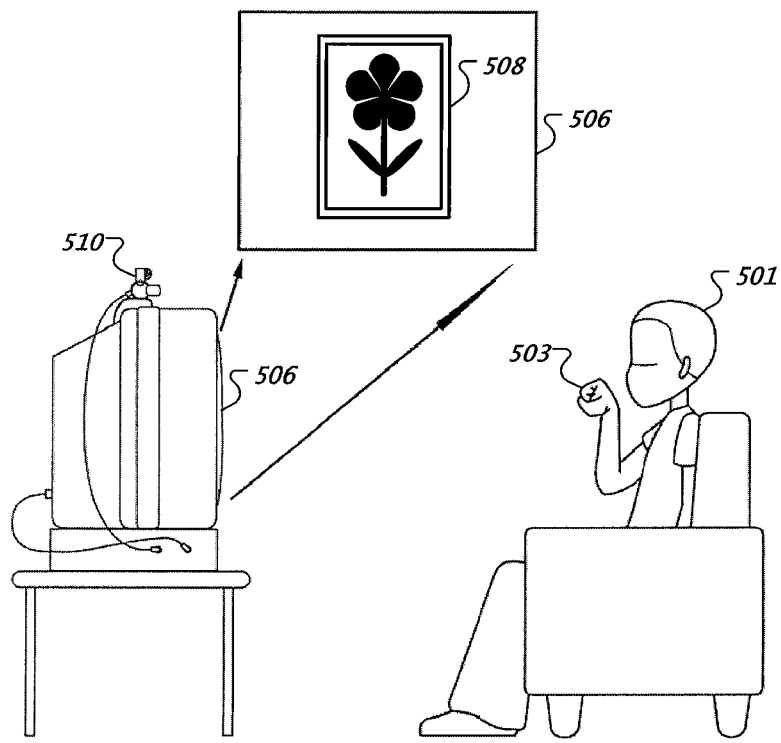

FIGS. 5A-5B illustrate an exemplary zoom-in gesture, in which a user 501 gesticulates his hand backward towards his body from a first position 502 to a second position 503, thereby causing the selected image object 504 in the display 506 to be displayed in a larger size (i.e., as image object 508, as shown in FIG. 5B). In a distance mode, a zoom distance may correspond to a hand's Z-position. A movement of the hand farther away from the camera 510 may be interpreted as a "zoom-in" command (i.e., the user is "pulling the image object closer").

Figure 6A:
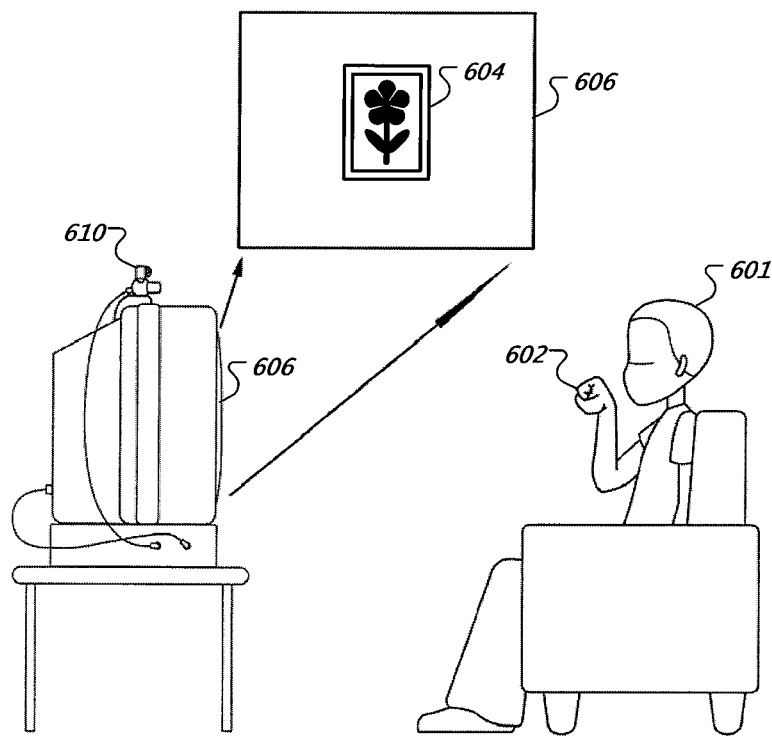
Figure 6B:
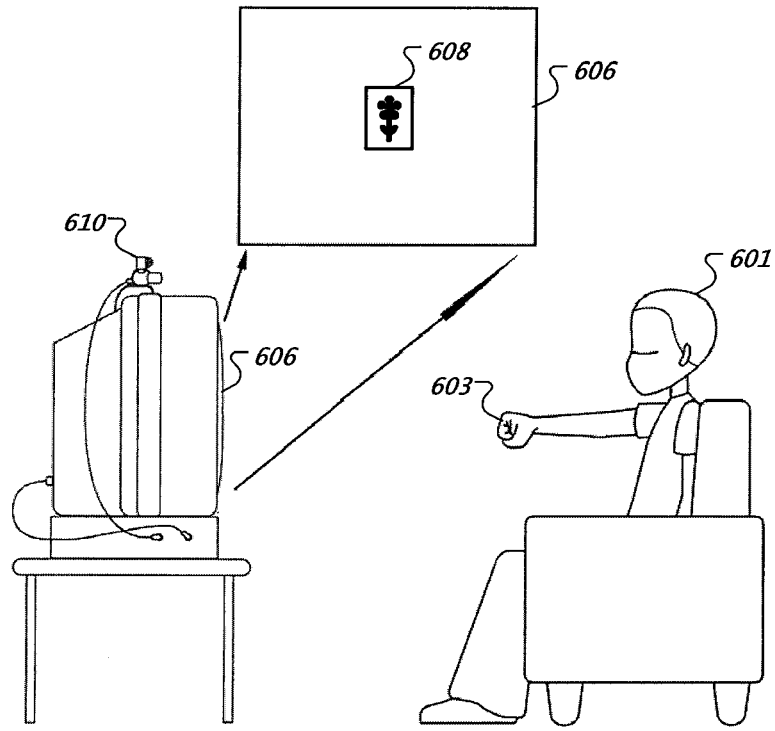

Similarly, FIGS. 6A-6B illustrate an exemplary "zoom-out" gesture, in which a user 601 gesticulates his hand forward away from his body from a first position 602 to a second position 603, thereby causing a selected image object 604 in the display 606 to be displayed in a smaller size (i.e., as image object 608, as shown in FIG. 6B). A movement of the hand closer to the camera 610 may be interpreted as a "zoom-out" command (i.e., the user is "pushing the image object away").

In some implementations, if the user opens his hand while moving his hand towards or away from his body, the selected image object may continue to zoom in or out at a velocity proportional to the velocity of the hand movement when the hand was opened. The zoom velocity may gradually decrease over time after the hand is opened.

In further implementations, the velocity of the hand motions or other gestures are determined, modeled, and applied to the image objects as if the image objects had mass or momentum. For instance a quick left wave gesture might move an image object to the left a further distance than a slow left wave gesture. Furthermore, the image objects may react as if the user interface were affected by frictional, drag, gravitational, or other forces, such that a "shove" gesture may result in the image object initially zooming out at a quick pace, then slowing as the time since the application of the virtual shove elapses.

Further, if an image object is in motion on the user interface in a first direction and a gesture is recognized travelling in a second opposite direction, the image object may continue to travel in the first direction until the "virtual" momentum assigned to the image object is overcome by the "virtual" momentum assigned to the gesture. These behaviors can be based on predefined or user defined settings, variables and coefficients that allow virtual interaction between a control object in free space and an image in the user interface, in an intuitive and visually pleasing manner.

FIGS. 7A-7E illustrate an exemplary "repositioning" gesture. A user 701 has his hand pulled back into his body at a position 702. If the user desires to zoom a selected image object in closer, he may not, with his hand in the position 702, be able to move his hand any further towards his body. The user 701 may "release" his hand (thereby canceling or suspending the zoom command) by opening his hand and spreading his fingers and thumb wide, as shown in a position 704.

The user 701 may then move his hand forward to a position 706, close his hand (as shown in position 708) to re-engage (i.e., reselect an image object), and finally, pull his hand backward towards his body to a position 710, thereby causing the selected image object to zoom to a larger size. In motion, it may appear that the user 701 is moving his hand in a swimming motion, in order to keep "pulling" the image in toward his body in a magnitude that exceeds that of a single "pull."

A similar "repositioning" gesture may be used to repeat other commands. For example, the user 701 may, when his hand is fully extended forward, open his hand, pull his hand backward, re-engage by closing his hand, and push his hand forward to resize an image object to a smaller size (i.e., zoom out farther). Similar pose sequences may be used to repeat movement, rotation, and other gesture commands. Poses used for repositioning gestures may be filtered. That is, the poses used strictly to reposition may not result in the manipulation of an object.

Figure 8A:
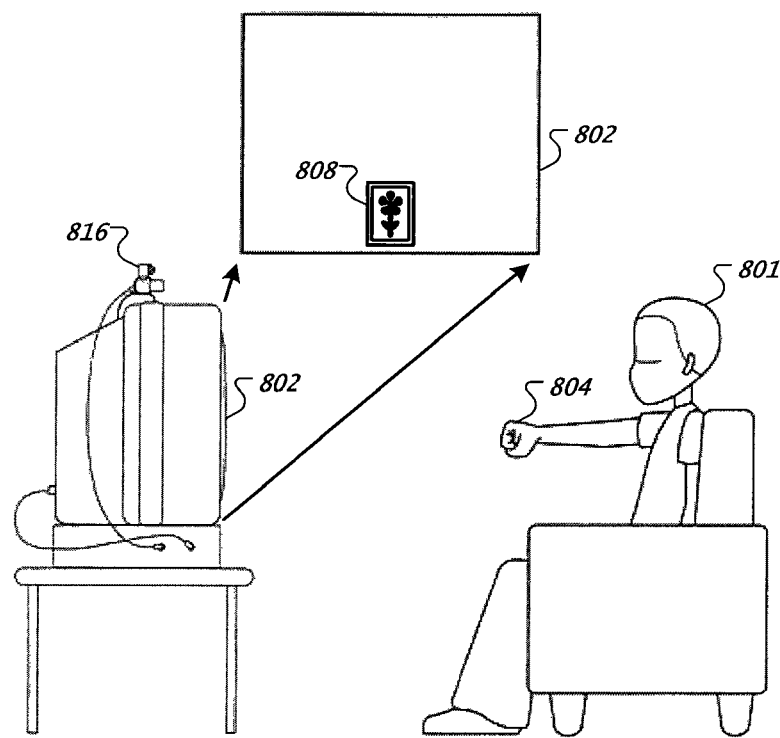
Figure 8B:
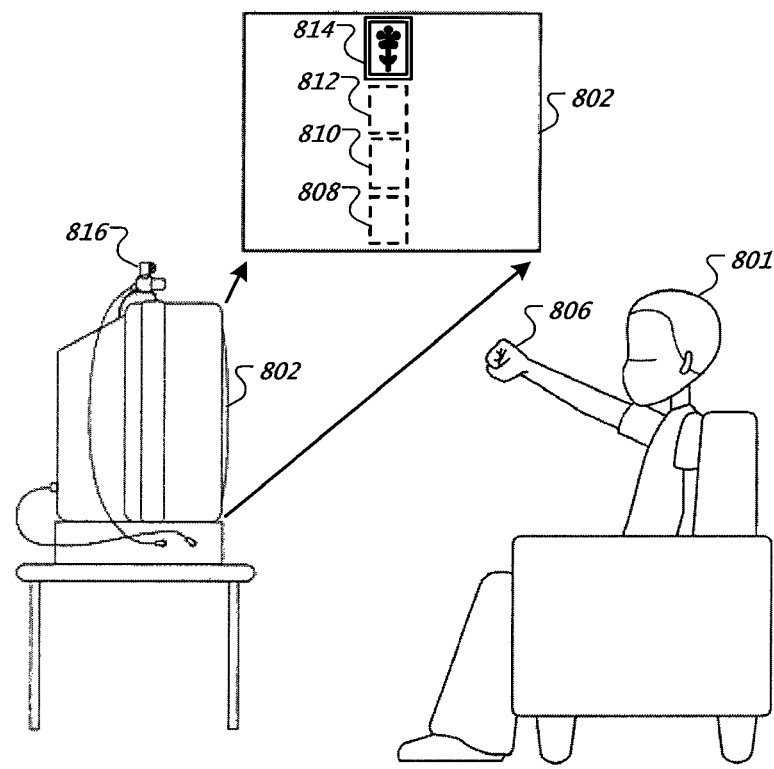

FIGS. 8A-8B illustrate an exemplary interaction that occurs in a "velocity mode." As mentioned above, a hand movement by a user 801 in an X-Y direction along a plane parallel to a display 802 may cause a movement of an image object proportional to the hand movement distance. Such movement may be referred to as "distance model". A distance model may be effective if there is a short magnification range or a limited number of zoom states. A distance model may not be as effective, however, if the displayed image object(s) support a large magnification range, such as a map which supports many zoom levels.

To support more effective zooming with large magnification ranges or to allow the user to make more discreet gesturing, a "velocity" model may be used. In a "velocity" model, a user gestures and then holds a pose. The "velocity" model allows a command to be repeated indefinitely without releasing the hand gesture (i.e., in contrast to the "distance" model where a release of the hand gesture is required, for example, to zoom beyond a certain distance). For example, the user 801 gesticulates his hand upward from a first position 804 to a second position 806, thereby causing a selected image object to move from a position 808 to a position 810. As the user 801 holds his hand in the position

806, the selected image object continues to move in the direction indicated by the gesture (i.e., upward in this case), to positions 812, 814, etc.

In a velocity model, the hand's X-Y position may be sampled and saved as a reference position when the user 801 closes his hand. The selected image object may move at a velocity proportional to the X-Y distance between the user's hand and the reference position (i.e., the selected image object may move faster as the user moves his hand farther away from the reference position). The selected image object may continue to zoom in/out at the current velocity if the user stops moving and maintains the engagement hand pose.

The mapping of relative distance to velocity may include a "dead zone," whereby the velocity may be zero if the relative distance is less than a dead zone distance, so that a user may stop the movement by returning the hand to near (but not necessarily exactly to) the reference position. The mapping of relative distance to velocity may be non-linear, such that a change in position near the reference position may result in a change of velocity of small magnitude, while a change in position further from the reference position may result in a change of velocity of larger magnitude. Non-linear mapping may allow a user fine control of low velocities, and coarser control of high velocities.

When using a velocity model, the velocity may return to zero if the user returns his hand position to within the dead zone; if the user changes the hand pose to palm forward and fingers and thumb spread; if the hand goes outside the field of view of a camera 816; if the user retracts his hand fully towards his body and drops his arm to his side; or if another event occurs. The velocity may return to zero by gradually diminishing over a short period of time.

A velocity model may be used with other gestures. For example, a velocity model may be used for image zoom and for image rotation (see FIG. 12 below). Different gestures may use different models. For example, image movement may use a distance model while image zooming may use a velocity model. A user may be able to switch between different models for a particular gesture. For example, a change model gesture may be defined which may toggle an image zoom model between velocity and distance models, allowing a user to select the most effective model.

Figure 9A:
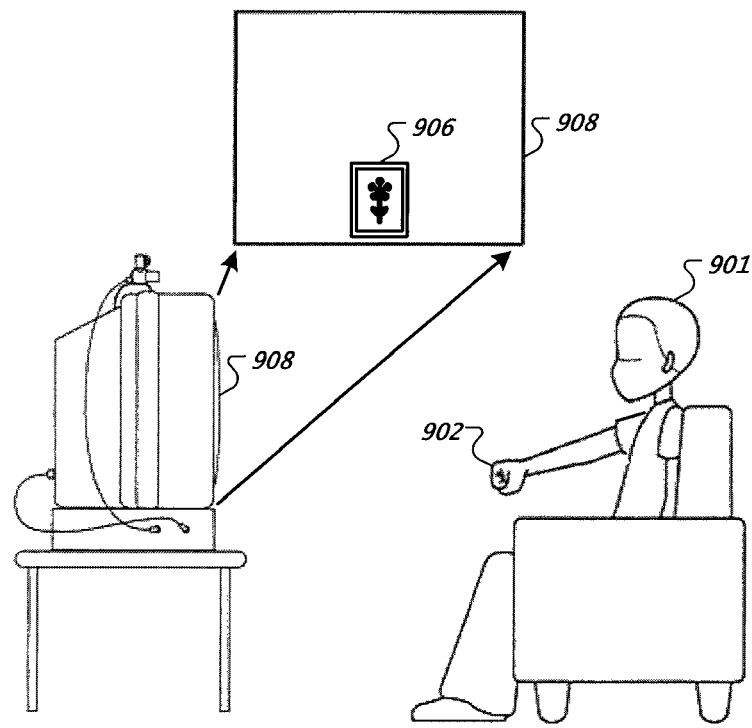
Figure 9B:
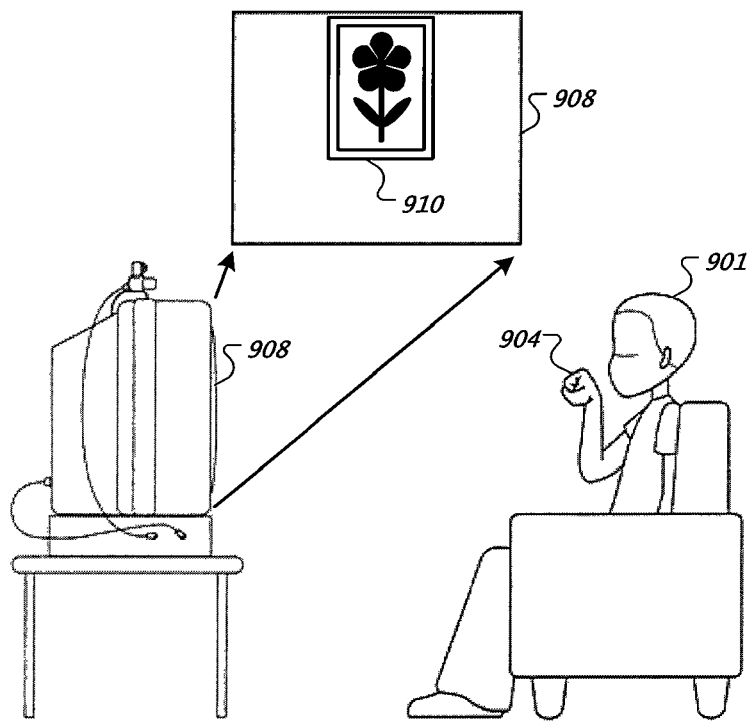

FIGS. 9A-9B illustrate an exemplary gesture combination, in which two or more independent image manipulations occur via a single gesture. If a user moves his hand in both a Z-direction and in an X-Y direction, different approaches may be used to determine whether an image zoom command, image movement command, or both commands should be performed. For example, in one approach, either movement or zooming may be selected based upon whichever distance is larger: movement in the z direction or movement in the X-Y plane. In another approach, either movement or zooming may be selected based upon whichever distance, movement in the z direction or movement in the X-Y plane, passes a threshold distance first after an engagement hand pose is detected (i.e., the type of command may be locked according to which gesture the user does first).

In a third approach, multiple commands are performed. For example, movement and zooming may occur at the same time if a user moves his hand in the z direction in addition to moving his hand in the x-y plane. In FIGS. 9A-9B, a user 901 gesticulates his arm upward and also backward towards his body from a first position 902 to a second position 904, thereby causing a selected image object 906 to both zoom and move within the display 908, as illustrated by a larger image object 910 located more towards the top of the display 908 than the image object 906.

Where multiple commands are performed, a command may be classified as a major command based upon the criteria described above (either whichever distance is larger, or whichever passes a threshold distance first), and other commands classified as minor commands. The "dead zone" (i.e. the minimum distance the user's hand must move from a reference position before causing a non-zero displacement or velocity of the on-screen object) of minor commands may be enlarged in the presence of multiple commands, so that unintentionally movement of the hand in some directions are ignored while performing a gesture in other directions.

Figure 10A:
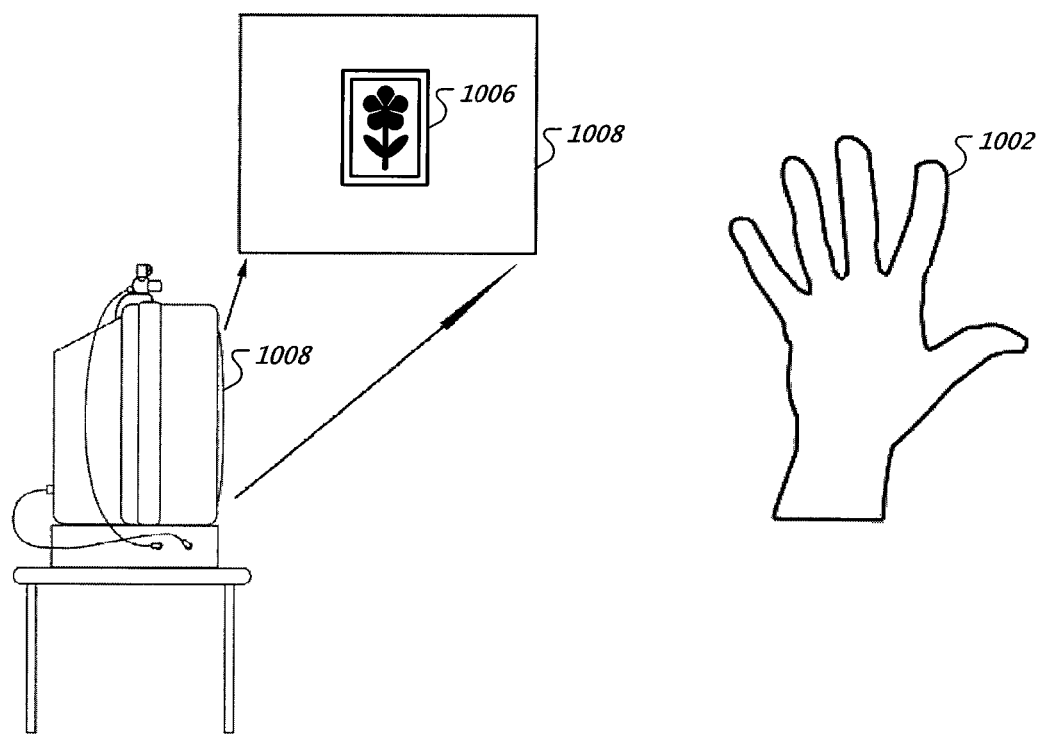
Figure 10B:
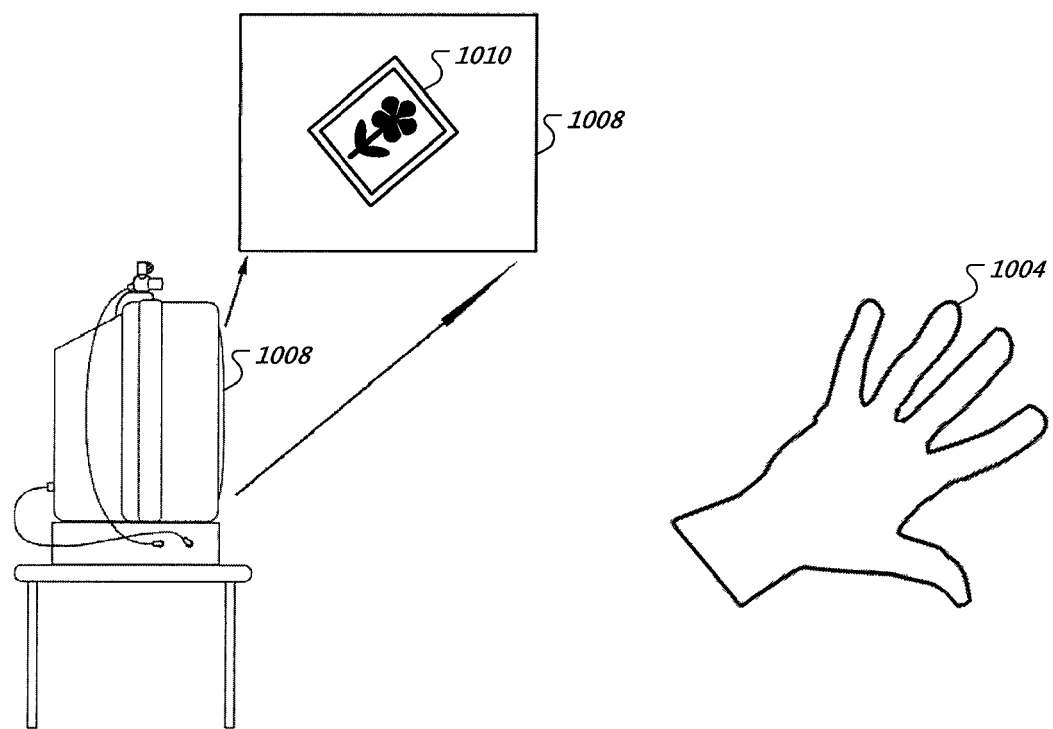

FIGS. 10A-10B illustrate an exemplary image rotation gesture, in which a user gesticulates his hand by rotating an open hand from a first vertical position 1002 to a second, angled position 1004, thereby causing a selected image object 1006 to rotate in the display 1008 (as illustrated by the rotated image object 1010) by the same angle as the detected rotation angle of the hand. A dead zone may be defined so that minor movement of the hand does not unintentionally rotate a selected image object.

In some implementations, a reference angle may be defined which may allow a user to rotate an image object 180 degrees without twisting his arm. For example, a rotation start position may be defined such that a user starts rotating clockwise by first placing his hand at a negative 90 degrees counterclockwise relative to a vertical position (i.e., with the fingers of the hand pointing leftward). From this start position, a user may rotate a full 180 degrees clockwise (i.e., with the hands ending in a position with the fingers pointing rightward).

Figure 11A:
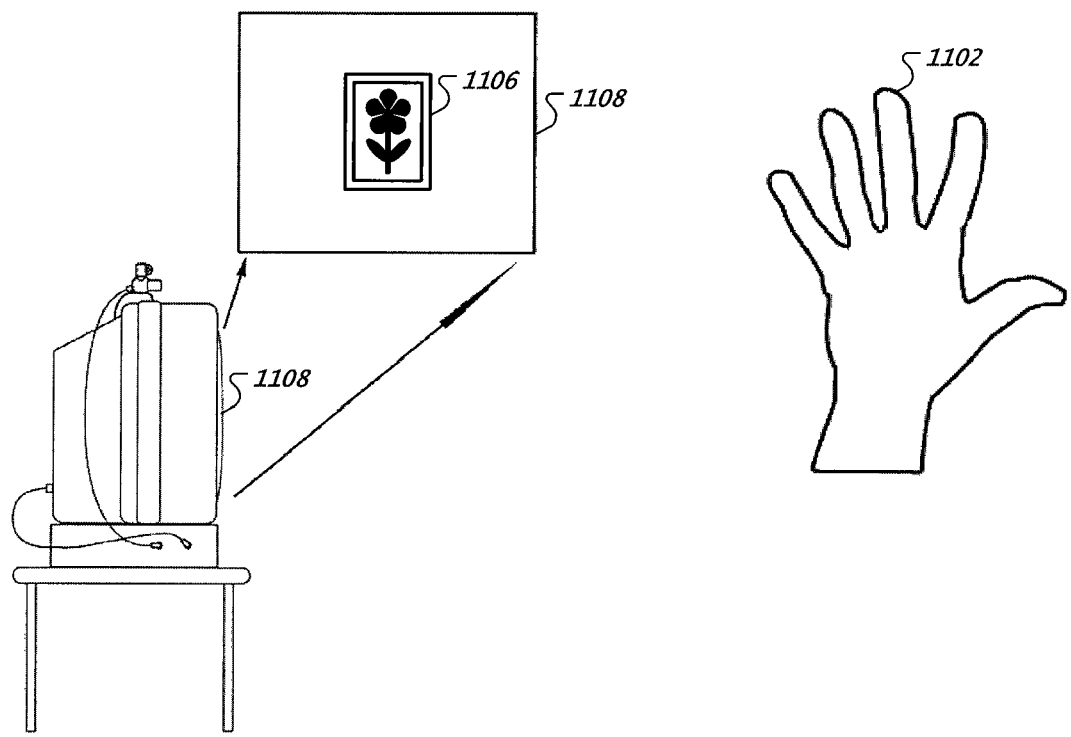
Figure 11B:
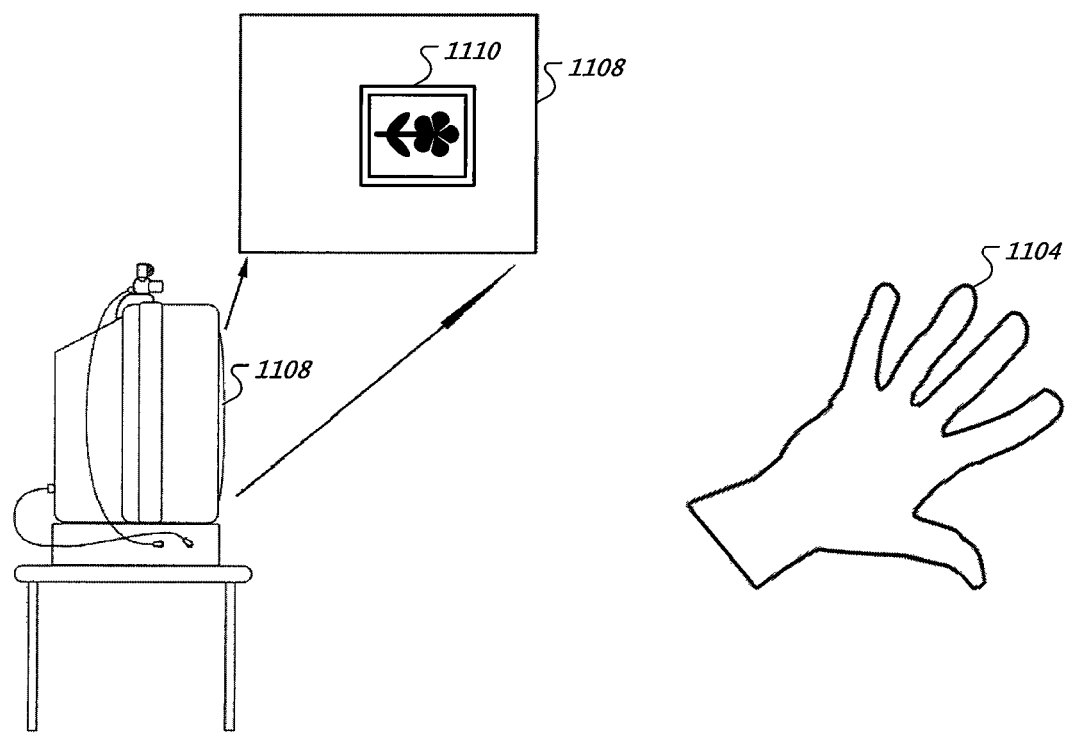

FIGS. 11A-11B illustrate an exemplary image rotation gesture with a "snap" mode. In a "snap" mode, an image rotation may, for example, "snap" to a reference angle of 0 degrees clockwise, 90 degrees clockwise, 90 degrees counterclockwise, or 180 degrees, depending upon which reference angle is closest to the hand angle of rotation. For example, in FIGS. 11A-11B, with a snap mode in effect, a user's hand gesticulates from a first vertical position 1102 to a second position 1104, where the second position 1104 is angled 50 degrees relative to the first position 1102. The hand rotation causes a selected image object 1106 to rotate to a reference angle of 90 degrees clockwise (i.e., 90 degrees rather than 50, due to the snap mode) in the display 1108, as illustrated by the image object 1110. As an onscreen indication, the selected image object may rotate in the display 1108 as the hand is being rotated, and may snap to the nearest reference angle when the gesture is released.

When a rotation snap mode is in effect, an onscreen indication may be displayed to indicate that a partial turn is recognized. A basis angle may be defined, and reference angles may be defined as the basis angle, the basis angle plus 90 degrees clockwise, the basis angle plus 90 degrees counterclockwise, and the basis angle plus 180 degrees.

Figure 12A:
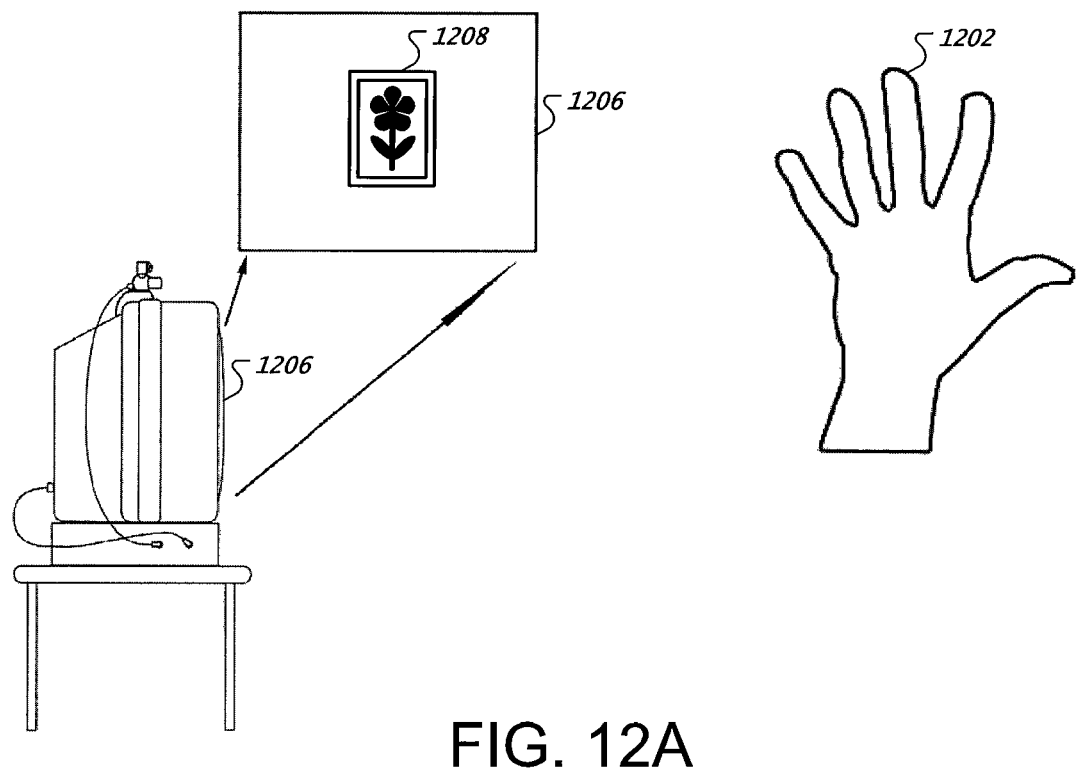
Figure 12B:
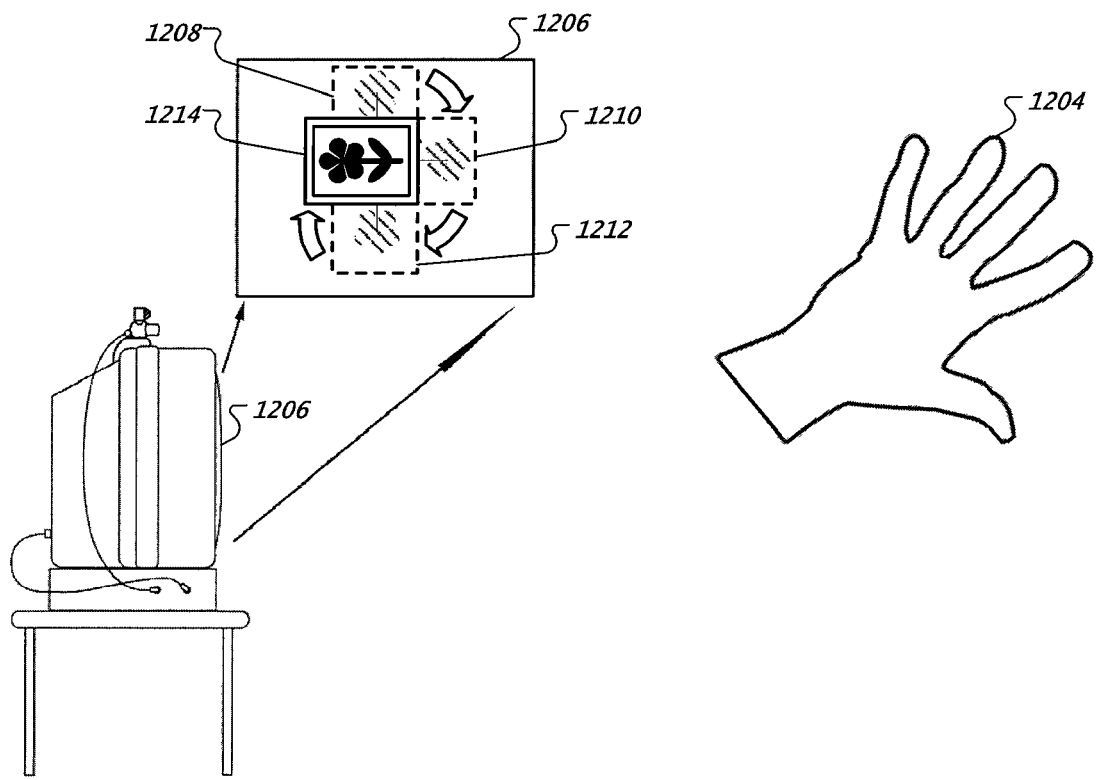

FIGS. 12A-12B illustrate an exemplary image rotation with velocity mode. As described above, in a velocity mode, an image manipulation command is repeated while a user holds a pose. For example, a user's hand gesticulates from a first vertical position 1202 to a second angled position 1204, thereby causing a selected image object to rotate clockwise in the display 1206 from a first position 1208 to a second position 1210. As the user holds the hand in position 1204, the selected image object continues to rotate in a clockwise direction, possibly passing through positions 1212 and 1214.

As an onscreen indication, the selected image object may rotate in the display 1206 as the pose is held. The image rotation may stop when the user releases the pose. The velocity of rotation may be proportional to the hand angle of rotation (i.e., the selected image object may rotate faster as hand rotation angles increase). The selected image object may "snap" to reference rotation angles (e.g., 0, 90 degrees clockwise, 90 degrees counterclockwise, or 180 degrees), depending on which reference angle the image object is nearest to when the user terminates the gesture.

Figure 13A:
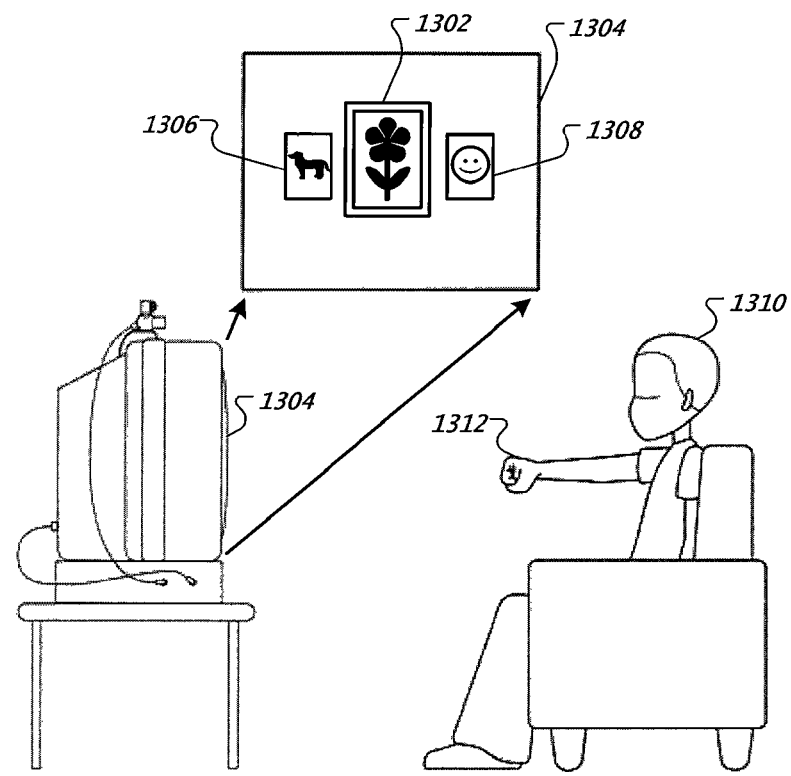
Figure 13B:
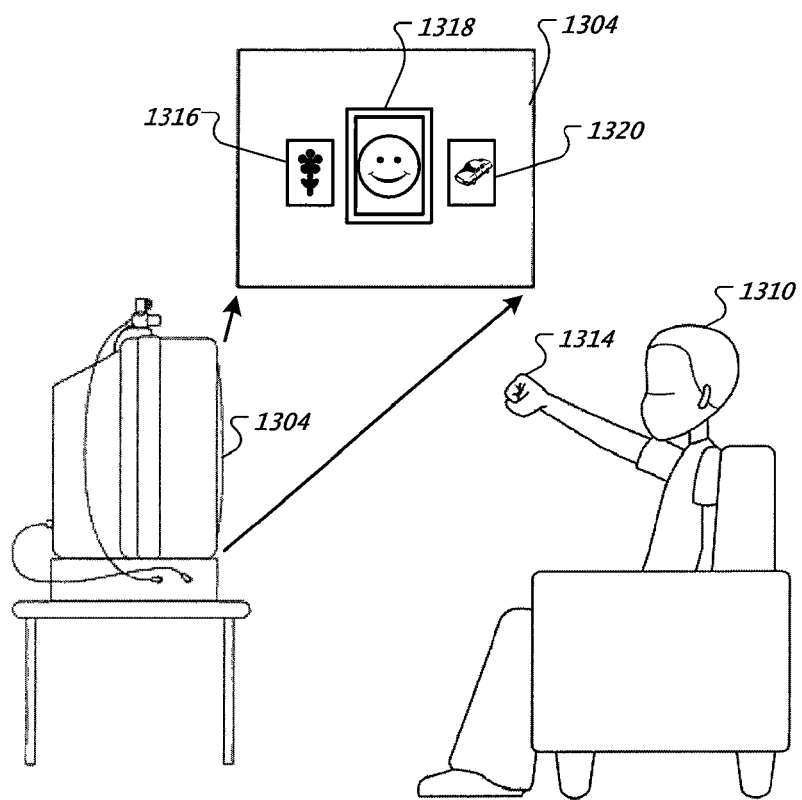

FIGS. 13A-13B illustrate an exemplary show-next-image gesture. A "current" image object 1302 may be scaled to fit a large center part of a display 1304. One or more "previous" 1306 and "next" 1308 image objects may be shown on the left or right side of the current image object 1302, and may be rendered smaller than the current image object 1302. A user 1310 gesticulates his hand upward from a first position 1312 to a second position 1314, thereby causing the current image object 1302 to be replaced by a new "current" image object.

More specifically, an animation may be accomplished as follows: the current image object 1302 may move leftward, be displayed in a smaller size, and become a new "previous" image object 1316; the "next" image object 1308 may move leftward, be displayed in a larger size, and become a new "current" image object 1318; the "previous" image object 1306 may be removed from the display 1304; and a new "next" image object 1320 may replace the old "next" image object 1308. A downward gesture may cause the animation to occur in the opposite direction.

Although the show-next-image and show-previous-image interactions have been illustrated in FIGS. 13A and 13B as upward and downward arm movements or gestures, use of such gestures is purely exemplary and has been chosen, inter alia, for ease of illustration. Specifically, in other exemplary implementations, left and right arm movements are used to input a show-previous-image or a show-next-image command, respectively. Left and right arm movements may be instinctual for a user to perform, since the previous image object and the next image object are displayed to the left and right of a current image, respectively.

The "current", "next" and "previous" image objects may be displayed in the same size (e.g., in a "filmstrip"). A filmstrip may or may not include the current image object. (i.e., a filmstrip may be shown below, above, or to the left or right side of the current image object). A filmstrip may include a thumbnail sized representation of the current image object, and one or more previous and next image objects.

The filmstrip may be animated to appear to scroll so that the current image object is always centered. If the current image object is not shown on the filmstrip, the boundary between the first next and first previous image objects may be centered. An up/down gesture may flip through lists of image objects (e.g., categories of image objects), and a left/right gesture may flip through image objects within a list. As another example, a left/right gesture may flip through image object lists, and an up/down gesture may flip through image objects within a list.

Figure 14A:
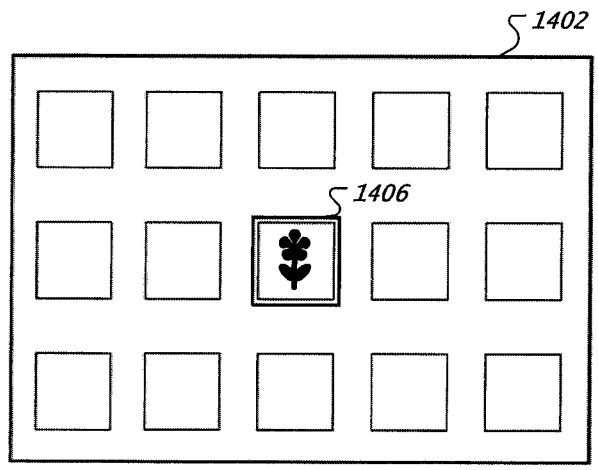
FIG. 14 illustrates thumbnail grids.
Figure 14B:
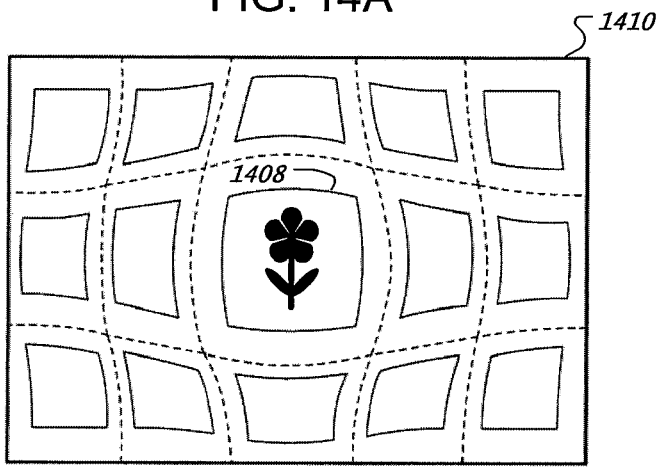
Figure 14C:
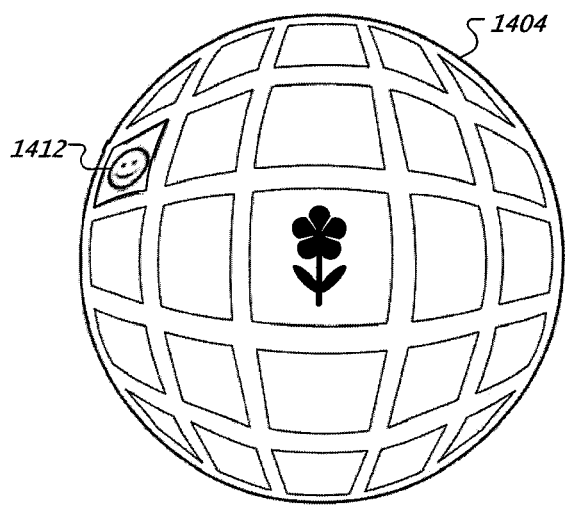

FIGS. 14A-14C illustrate thumbnail states. A grid of thumbnails may be displayed, for example, in a rectangular grid (e.g., grid 1402). The grid may also appear, for example, as a cylindrical shape or as a spherical shape (e.g., grid 1404).

An onscreen indication may indicate to the user which image object is the current image object. For example, the current image object may be displayed using a highlighted effect, such as a border, shadow, or glow. For example, a current image object 1406 is displayed with a darkened double border in the grid 1402.

The current image object may be displayed as the same size, or at a slightly larger size than other image objects. Image objects surrounding the current image object may be displayed at a size depending on the distance from the current thumbnail (i.e., image objects located farther away from the current image object may appear smaller than image objects located closer to the current image object). Image objects may be displayed in a size and shape to appear as a "bulge" (e.g., image object 1408 in grid 1410). Image objects may appear to wrap around a cylinder or sphere (e.g., image object 1412 in grid 1404).

A movement gesture may cause a selection of a current image object within a grid. A grid may remain stationary, or a grid may pan so that the current image object is always in the center of the screen. A flat grid (e.g., grid 1402) may wrap, or a cylinder or spherical grid (e.g., 1404) may spin, such that if the user pans left he will eventually reach the same image object that he started on. As another example, the image objects may be laid out on a flat, cylindrical, or spherical surface in a spiral, so that a flat grid may wrap, or a cylinder or spherical grid may spin such that if the user pans left he will eventually reach the image object directly underneath the image object that he started on.

The number of image objects on a cylinder of sphere may or may not match its circumference, and a user may spin a cylinder or sphere several revolutions to return to the starting thumbnail. For example, a cylinder may be rendered to have twelve thumbnails around its circumference, where some of the thumbnails may be hidden on the back-side. Thumbnails may be populated with image objects based on how many image objects are in an image object list. If there are fewer image objects in a list than visible thumbnails, an image object may appear on multiple thumbnails.

A thumbnail grid may be referred to as a first thumbnail state. While viewing a thumbnail grid, the user may zoom out to reveal a list (e.g., a category or other list) thumbnail state. A list thumbnail state may be referred to as a second thumbnail state. Each thumbnail within a second thumbnail state may be displayed as flat, cylindrical, or spherical structures of the first thumbnail state. A transition between the first and second thumbnail states may be displayed as an animation similar in style to "zooming in/out of a molecule". That is, a second thumbnail state may be described as being similar to viewing a chemical structure of a molecule and a first thumbnail state may be described as being similar to zooming into a molecule to view its photons and electrons.

As another example, a second thumbnail state may be described as being similar to viewing a collection of stars in a solar system while a first thumbnail state may be described as being similar to zooming into a star to view its planets. A zoom gesture may optionally "snap" to a state. For example, if the user terminates a zoom gesture when an image object is close to fitting to the screen, the system may animate the image object movement to reach the fit-to-screen state.

In some implementations, a two handed gesture may be used to manipulate an image object. A user may point with two hands, such as pointing to the corners of an image object. To rotate an image object, the user may move his hands as if to trace out points on opposite sides of a circular path. The angle between the x-y components of the hand positions is measured. It does not matter which sides or corners the user initially points to, as the rotation will be relative to the initial hand positions. A reference angle is recorded after a short delay (e.g., 500 milliseconds), to allow the user time to raise the second hand into position. After detecting both hands, or after a "hover" is detected (i.e., after a short period (e.g., 500 milliseconds) of time has elapsed with both hand positions moving less than a threshold distance), the image object is rotated by the current angle between the hand positions relative to the reference angle. The image object may snap to the nearest 90 degrees when both hands are no longer detected.

To zoom in or out of an image object, the user may move both hands closer or further apart. The distance between the x-y components of the hand positions is measured. A reference distance is recorded after a short delay (e.g., 500 milliseconds), to allow the user time to raise the second hand into position. After detecting both hands, or after a "hover" is detected, the distance relative to the reference distance may be mapped to a scale, or to a velocity, and the image object may be zoomed accordingly.

To move an image object left, right, up, or down, the user may move both hands in the same direction, keeping the distance and angle between the hands constant. The average of the X-Y components of the hand positions is measured. A reference position is recorded after a short delay (e.g., 500 milliseconds) to allow the user time to raise the second hand into position. After detecting both hands, or after a "hover" is detected, the average position relative to the reference position may be mapped to a position within an image object, or to a velocity, and the image object may be moved accordingly.

The enabling gesture may result in the control object (i.e. hand) of the user's body being disposed in an awkward position. For instance, as a result of a "swiping" enabling gesture, the user's hand may lie near the boundary of or outside of a camera's field of view. In these and other circumstances, a process may occur to orient or align the user's control object with a target position (in free space) that eases or improves future gesture recognitions. The target position in free space may be predefined, such as a center position of the camera's field of view, or the target position may be dynamically determined, for instance in a well-lit position, or an area of high contrast or without a complex background, or in a region of the field of view away from other moving objects.

One approach for aligning the user's position for improved gesture recognition is to display the representation and a target image on the user interface or on the user interface, to infer to or guide the user to move the representation through motion of their body, so that the representation aligns with the target image. Thus, the representation of the user may initially be displayed outside a central region of the user interface, and a target image may be displayed in the central region.

In other images, a realignment gesture may be recognized, the representation may be moved in relation to the target image based on the realignment gesture. If the moved representation aligns with the target image, the representation will be displayed in the central region. Realignment may assure the user's hand remains in the camera's field of view, or may also assure the user has enough reach of the arm to perform the gestures in one or more directions.

Figure 15:
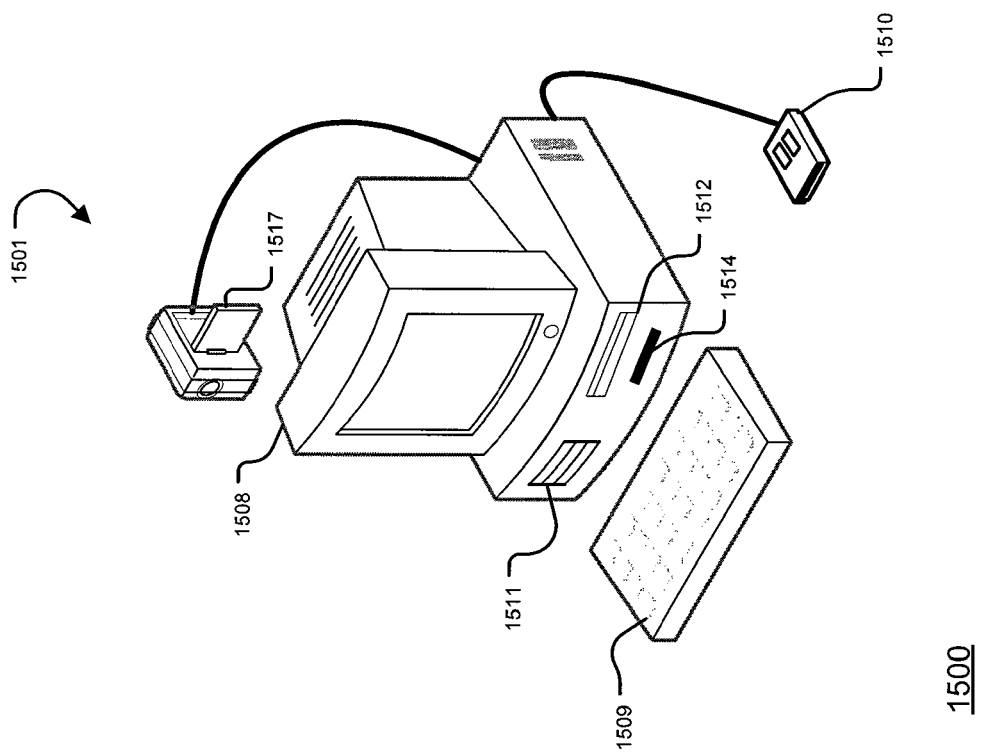
FIG. 15 illustrates an example of the exterior appearance of a computing device that further includes a processor and a user interface.

FIG. 15 illustrates an example of the exterior appearance of a computing device 1501 that further includes a processor and a user interface. In a further general implementation, a device includes a user interface and a processor. The user interface is configured to display one or more image objects. The processor is configured to recognize, from first and second images, a user's gesture, to determine an interaction command corresponding to the recognized user's gesture, and to manipulate, based on the determined interaction command, an image object displayed in a user interface.

In more detail, the hardware environment of the computing device 1501 includes a display monitor 1508 for displaying text and images to interface with a user, a keyboard 1509 for entering text data and user commands into the computing device 1501, a mouse 1510 for pointing, selecting and manipulating objects displayed on the display monitor 1508, a fixed disk drive 1511, a removable disk drive 1512, a tape drive 1514, a hardcopy output device, a computer network connection, and a digital input device 1517.

The display monitor 1508 displays the graphics, images, and text that make up the user interface for the software applications used by the computing device 1501, as well as the operating system programs necessary to operate the computing device 1501. A user uses the keyboard 1509 to enter commands and data to operate and control the computer operating system programs as well as the application programs. The mouse 1510 may be any type of pointing device, and may be a joystick, a trackball, a touch-pad, or other pointing device. Software used to display a user interface and enable a user to enter or select text, numbers, or select from a menu of options is stored locally on computer readable memory media, such as the fixed disk drive 1511.

In a further implementation, the fixed disk drive 1511 itself may include a number of physical drive units, such as a redundant array of independent disks ("RAID"), or may be a disk drive farm or a disk array that is physically located in a separate computing unit. Such computer readable memory media allow the computing device 1501 to access computer-executable process steps, application programs and the like, stored on removable and non-removable memory media.

The computer network connection may be a modem connection, a local-area network ("LAN") connection including the Ethernet, or a broadband wide-area network ("WAN") connection such as a digital subscriber line ("DSL"), cable high-speed internet connection, a broadband over power line connection, dial-up connection, T-1 line, T-3 line, fiber optic connection, or satellite connection. The network 1306 may be a LAN network, a corporate or government WAN network, the Internet, or other network.

The computer network connection may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wireline connector.

The removable disk drive 1512 is a removable storage device that is used to off-load data from the computing device 1501 or upload data onto the computing device 1501. The removable disk drive 1512 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1511 or on removable media for the removable disk drive 1512.

The tape drive 1514 is a tape storage device that is used to off-load data from the computing device 1501 or to upload data onto the computing device 1501. The tape drive 1514 may be a quarter-inch cartridge ("QIC"), 4 mm digital audio tape ("DAT"), 8 mm digital linear tape ("DLT") drive, or other type of tape.

Furthermore, although the computing device 1501 is described above as a desktop PC, in further implementations the computing device 1501 may be a laptop, a workstation, a midrange computer, a mainframe, an embedded system, telephone, a handheld or tablet computer, a PDA, a gaming device or console, a digital picture frame, a teleconferencing device, or other type of computer.

Figure 16:
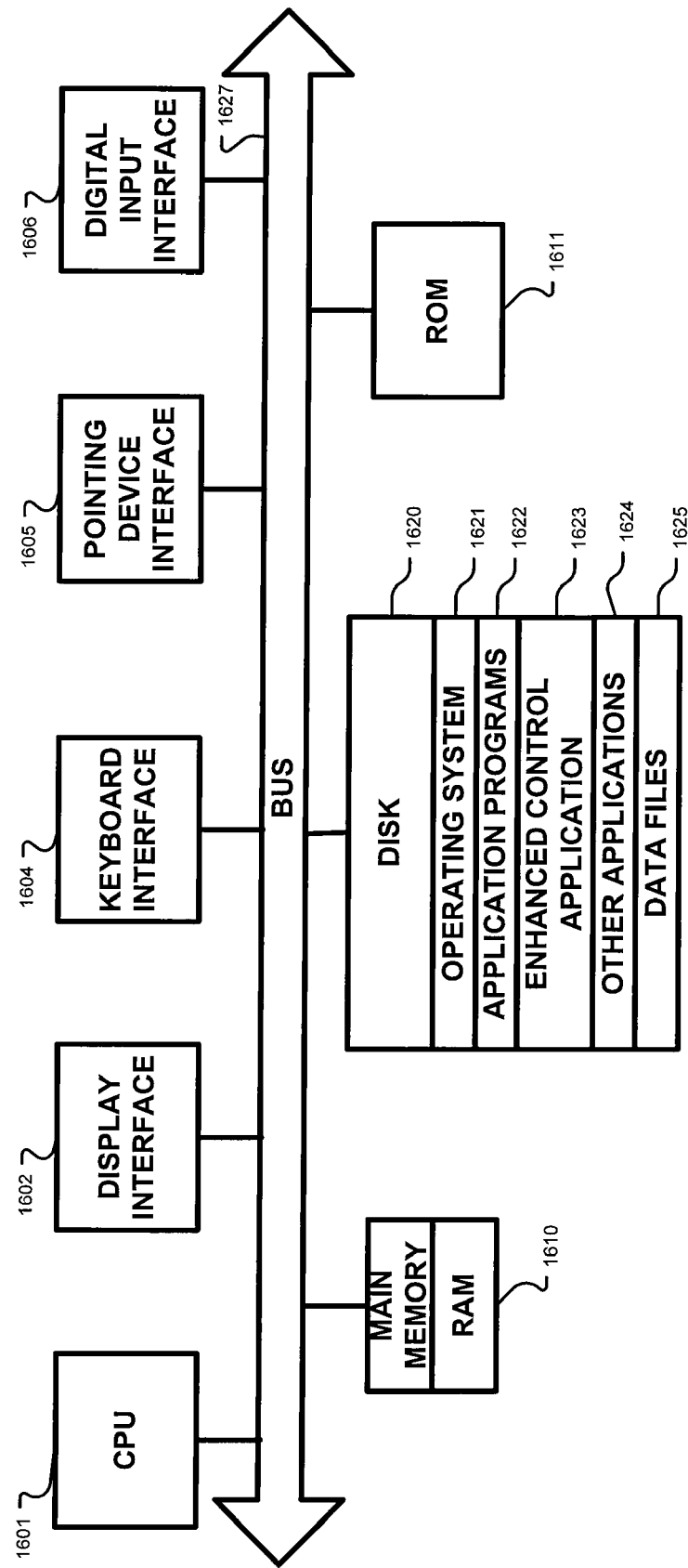
FIG. 16 is a block diagram illustrating the internal architecture of the computer shown in FIG. 15.
Like reference numbers represent corresponding parts throughout

FIG. 16 is a block diagram illustrating the internal architecture of a computer shown in FIG. 15. An exemplary internal architecture of the computing device 1501 is now described. The computing environment includes a computer central processing unit ("CPU") 1601, where the computer instructions that make up an operating system or an application are processed; a display interface 1602 which provides a communication interface and processing functions for rendering graphics, images, and texts on the display monitor 1508; a keyboard interface 1604 which provides a communication interface to the keyboard 1509; a pointing device interface 1605 which provides a communication interface to the mouse 1510 or an equivalent pointing device; a digital input interface 1606 which provides a communication interface to the digital input device 1517; a hardcopy output device interface which provides a communication interface to the hardcopy output device; a random access memory ("RAM") 1610 where computer instructions and data are stored in a volatile memory device for processing by the computer CPU 1601; a read-only memory ("ROM") 1611 where invariant low-level systems code or data for basic system functions such as basic input and output ("I/O"), startup, or reception of keystrokes from the keyboard 1509 are stored in a non-volatile memory device; and a storage 1620 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that make up an operating system 1621, application programs 1622 (including the enhanced control application 1623, and other applications 1624 as necessary) and data files 1625 are stored; a computer network interface which provides a communication interface to the network over the computer network connection. The constituent devices and the computer CPU 1601 communicate with each other over the computer bus 1627.

According to one general implementation, a computer program product is tangibly embodied or recorded in a machine-readable medium such as storage 1620. The computer program product includes instructions that, when read by a machine, operate to cause data processing apparatus to recognize, from first and second images, a user's gesture, to determine an interaction command corresponding to the recognized user's gesture, and to manipulate, based on the determined interaction command, an image object displayed in a user interface.

The RAM 1610 interfaces with the computer bus 1627 so as to provide quick RAM storage to the computer CPU 1601 during the execution of software programs such as the operating system application programs, and device drivers. More specifically, the computer CPU 1601 loads computer-executable process steps from the fixed disk drive 1511 or other memory media into a field of the RAM 1610 in order to execute software programs. Data is stored in the RAM 1610, where the data is accessed by the computer CPU 1601 during execution.

The computing device 1501 stores computer-executable code for an operating system 1621, application programs 1622 such as word processing, spreadsheet, presentation, gaming, or other applications. It is possible to implement the functions according to the present disclosure as a dynamic link library ("DLL"), or as a plug-in to other application programs such as an Internet web-browser such as the MICROSOFT® Internet Explorer web browser.

The computer CPU 1601 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1601 is more than one processing unit, including a multiple CPU configuration found in high-performance workstations and servers, or a multiple scalable processing unit found in mainframes.

The operating system 1621 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1621 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 15 and 16 illustrate one possible implementation of a computing device that executes program code, or program or process steps, configured to provide for an enhanced control that allows for a user to intuitively and easily enter text, numbers, or select from a plurality of items, other types of computers or implementations may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
causing a display to render an image object in a user interface;
determining a position of a user's torso;
defining, with a processing unit, a plane relative to the user's torso, based on the determined position;
ignoring, by the processing unit, movements of the user that are made on a far side of the plane from a camera capturing images of the user;
determining, with the processing unit, an extent to which the user is able to reach;
recognizing, from first and second images captured by the camera, a user's gesture performed between the camera and the plane;
determining, with the processing unit, an interaction command corresponding to the recognized user's gesture; and
manipulating, with a processing unit and based on the determined interaction command, the image object displayed in the user interface, wherein a magnitude of the manipulation is related to a proximity of the user's gesture to the determined extent to which the user is able to reach.

2. The method of claim 1, wherein: the interaction command comprises a selection command, and manipulating the image object further comprises selecting the image object for further manipulation.

3. The method of claim 1, wherein: the interaction command comprises an image pan command, and manipulating the image object further comprises panning the image object relative to the user interface.

4. The method of claim 3, wherein recognizing the user's gesture further comprises:
detecting a first position of an arm of the user in the first image;
detecting a second position of the arm of the user in the second image; and
determining a magnitude and direction of a change between the first position and the second position.

5. The method of claim 4, wherein, in a distance mode, manipulating the image object further comprises:
determining a displacement position of the image object correlating to the determined magnitude and direction; and
displaying the image object in the displacement position.

6. The method of claim 4, wherein, in a velocity mode, the magnitude of the manipulation comprises a scroll magnitude, and the scroll magnitude and direction correlates to the determined magnitude and direction; and
manipulating the image object further comprises scrolling the image object based on the determined scroll magnitude and direction.

7. The method of claim 1, wherein: the interaction command comprises an image zoom command, and manipulating the image object further comprises zooming the image object relative to the user interface.

8. The method of claim 7, wherein recognizing the user's gesture further comprises:
detecting a first position of an arm of the user in the first image;
detecting a second position of the arm of the user in the second image; and
determining a magnitude and direction of a change between the first position and the second position.

9. The method of claim 8, wherein, in a distance mode, manipulating the image object further comprises:
determining a magnification factor correlating to the determined magnitude and direction; and
applying the determined magnification factor to the image object.

10. The method of claim 8, wherein, in a velocity mode, the magnitude of the manipulation comprises an adjustment magnitude, and the adjustment magnitude and direction correlates to the determined magnitude and direction; and
manipulating the image object further comprises iteratively adjusting a magnification factor of the image object based on the determined adjustment magnitude and direction.

11. The method of claim 1, wherein: the interaction command comprises a rotation command, and manipulating the object further comprises rotating the image object relative to the user interface.

12. The method of claim 11, wherein recognizing the user's gesture further comprises:
detecting a first orientation of a hand of the user in the first image;
detecting a second orientation of the hand of the user in the second image; and
determining an orientation change between the first position and the second position.

13. The method of claim 12, wherein, in a distance mode, manipulating the image object further comprises:
determining displacement orientation of the image object correlating to the determined magnitude and direction; and
displaying the image object in the displacement orientation.

14. The method of claim 12, wherein, in a velocity mode, manipulating the image object further comprises:
the magnitude of the manipulation comprises an adjustment magnitude, and the adjustment magnitude and direction correlates to the determined magnitude and direction; and
manipulating the image object further comprises iteratively adjusting an orientation of the image object based on the determined adjustment magnitude and direction.

15. The method of claim 1, wherein the image object is manipulated in a manipulation direction mirroring a direction of the user's gesture.

16. The method of claim 1, wherein: recognizing the user's gesture further comprises: recognizing a first selection gesture, recognizing a first interaction gesture, recognizing a de-selection gesture, recognizing a repositioning gesture, recognizing a second selection gesture, and recognizing a second interaction gesture; and manipulating the image object further comprises: selecting the image object based on recognizing the first selection gesture, adjusting, using a single adjustment technique associated with the first and second interaction gestures, the image object based on recognizing the first and second interaction gestures, and filtering the repositioning gesture.

17. The method of claim 1, wherein: the interaction command comprises a preview image command, and manipulating the image object further comprises selecting, from a plurality of preview image objects, the image object.

18. The computer-implemented method if claim 1, wherein causing the display to render the image object in the user interface comprises sending information to the display via a display interface of a computer.

19. The computer-implemented method if claim 1, further comprising receiving the first and second images from the camera via a digital input interface of a computer.

20. An apparatus comprising:
a processor configured to:
  cause a display to render an image object in a user interface;
  determine a position of a user's torso;
  define a plane relative to the user's torso, based on the determined position;
  ignore movements of the user that are made on a far side of the plane from a camera capturing images of the user;
  determine an extent to which the user is able to reach;
  recognize, from first and second images captured by the camera, a user's gesture performed between the camera and the plane;
  determine an interaction command corresponding to the recognized user's gesture; and
manipulate, based on the determined interaction command, the image object displayed in the user interface, wherein a magnitude of the manipulation is related to a proximity of the user's gesture to the determined extent to which the user is able to reach.

21. A non-transitory processor-readable medium comprising processor-readable instructions configured to cause a processor to:
  causing a display to render an image object in a user interface;
  determine a position of a user's torso;
  define a plane relative to the user's torso, based on the determined position;
  ignore movements of the user that are made on a far side of the plane from a camera capturing images of the user;
  determine an extent to which the user is able to reach;
  recognize, from first and second images captured by the camera, a user's gesture performed between the camera and the plane;
  determine an interaction command corresponding to the recognized user's gesture; and
  manipulate, based on the determined interaction command, the image object displayed in the user interface, wherein a magnitude of the manipulation is related to a proximity of the user's gesture to the determined extent to which the user is able to reach.

22. The computer-implemented method if claim 1, wherein determining an extent of the user's reach comprises using an anatomical model.

* * * * *